US012663748B2

(12) United States Patent
Izaki et al.

(10) Patent No.: US 12,663,748 B2
(45) Date of Patent: Jun. 23, 2026

(54) IMAGE FORMING APPARATUS

(71) Applicant: CANON KABUSHIKI KAISHA, Tokyo (JP)

(72) Inventors: Yu Izaki, Shizuoka (JP); Kenji Takagi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 14 days.

(21) Appl. No.: 18/778,197

(22) Filed: Jul. 19, 2024

(65) Prior Publication Data

US 2025/0053129 A1 Feb. 13, 2025

(30) Foreign Application Priority Data

Aug. 10, 2023 (JP) ................................. 2023-131545

(51) Int. Cl.
*G03G 15/00* (2006.01)
*B42C 9/00* (2006.01)

(52) U.S. Cl.
CPC ....... *G03G 15/6585* (2013.01); *B42C 9/0081* (2013.01); *G03G 15/6544* (2013.01); *G03G 2215/00835* (2013.01)

(58) Field of Classification Search
CPC ........... G03G 15/6585; G03G 15/6544; G03G 2215/00835
See application file for complete search history.

(56) References Cited

U.S. PATENT DOCUMENTS 9,110,425 B2 8/2015 Watanabe et al.
2009/0133619 A1* 5/2009 Tsuchiya ............... B42C 9/0012 118/261
2012/0155944 A1* 6/2012 Matsue .............. G03G 15/6541 399/408
2013/0051886 A1* 2/2013 Watanabe .......... G03G 15/6544 399/409
2020/0133178 A1* 4/2020 Arai ..................... G03G 7/0093
2022/0035296 A1* 2/2022 Nishizawa ............. B65H 31/02

FOREIGN PATENT DOCUMENTS

EP 1057654 A2 12/2000
JP 2005162352 A 6/2005
JP 2013043751 A 3/2013
JP 2015196567 A 11/2015

OTHER PUBLICATIONS

Extended European search report issued in European Appln. No. 24190570.2 mailed on Jan. 8, 2025.

* cited by examiner

*Primary Examiner* — David H Banh
(74) *Attorney, Agent, or Firm* — ROSSI, KIMMS & McDOWELL LLP

(57) ABSTRACT

An image forming apparatus includes an image forming unit configured to form a visible image and a bonding pattern on a sheet, and a bonding unit configured to heat a plurality of sheets in a stacked state, to bond the plurality of sheets together via the bonding pattern. The bonding pattern includes a first side portion, a second side portion, a third side portion, a first corner portion, a second corner portion, and a third corner portion. The second corner portion and the third corner portion are curved such that a minimum value of a radius of curvature of the second corner portion and a minimum value of a radius of curvature of the third corner portion are greater than a minimum value of a radius of curvature of the first corner portion.

14 Claims, 12 Drawing Sheets

IMAGE FORMING APPARATUS

BACKGROUND OF THE INVENTION

Field of the Invention

The present invention relates to an image forming apparatus for forming images on sheets.

Description of the Related Art

Japanese Patent Application Laid-Open Publication No. 2013-043751 discloses an image forming apparatus that forms a pattern image using adhesive toner on a corner portion of a sheet, and then heats and bonds a bundle of sheets, wherein the apparatus enables to set a bonding strength by varying an area ratio of the pattern image.

Japanese Patent Application Laid-Open Publication No. 2005-162352 discloses an image forming apparatus that forms an adhesive toner pattern along a long edge of a sheet, and then heats and bonds a sheet bundle, wherein an amount of toner at end portions of the longitudinal edge direction are set to be greater than the amount of toner at a center portion to thereby enhance bonding strength of the end portion areas.

According to the respective documents described above, the toner layer for bonding is formed of a pattern having a right-angled triangle shape or a pattern having a rectangular shape. Therefore, when a user turns over the sheets of the sheet bundle, stress was concentrated on the corner portion of the pattern, and there was a possibility that the sheets were peeled unintentionally from the corner portion serving as the starting point.

SUMMARY OF THE INVENTION

The present invention provides an image forming apparatus in which unintentional peeling of sheets can be reduced.

According to an aspect of the invention, an image forming apparatus includes an image forming unit configured to form a visible image and a bonding pattern on a sheet, the bonding pattern being formed of powder adhesive and to be used to bond sheets together, and a bonding unit configured to heat a plurality of sheets in a stacked state, to bond the plurality of sheets together via the bonding pattern, wherein the bonding pattern includes a first side portion, a second side portion, a third side portion, a first corner portion connecting the first side portion and the second side portion, a second corner portion connecting the second side portion and the third side portion, and a third corner portion connecting the third side portion and the first side portion, wherein in a direction of a diagonal line of the sheet that passes a corner of the sheet at which a first edge and a second edge of the sheet intersect, the first corner portion is positioned at an end portion of the bonding pattern on a near side to the corner of the sheet, wherein in a direction in which the first edge of the sheet extends, the second corner portion is positioned at an end portion of the bonding pattern on a far side from the second edge, wherein in a direction in which the second edge of the sheet extends, the third corner portion is positioned at an end portion of the bonding pattern on a far side from the first edge, and wherein the second corner portion and the third corner portion are curved such that a minimum value of a radius of curvature of the second corner portion and a minimum value of a radius of curvature of the third corner portion are greater than a minimum value of a radius of curvature of the first corner portion.

According to another aspect of the invention, an image forming apparatus includes an image forming unit configured to form a visible image and a bonding pattern on a sheet, the bonding pattern being formed of powder adhesive and to be used to bond sheets together, and a bonding unit configured to heat a plurality of sheets in a stacked state, to bond the plurality of sheets together via the bonding pattern, wherein the bonding pattern includes a first side portion, a second side portion, a third side portion, a first corner portion connecting the first side portion and the second side portion, a second corner portion connecting the second side portion and the third side portion, and a third corner portion connecting the third side portion and the first side portion, wherein in a direction of a diagonal line of the sheet that passes a corner of the sheet at which a first edge and a second edge of the sheet intersect, the first corner portion is positioned at an end portion of the bonding pattern on a near side to the corner of the sheet, wherein in a direction in which the first edge of the sheet extends, the second corner portion is positioned at an end portion of the bonding pattern on a far side from the second edge, wherein in a direction in which the second edge of the sheet extends, the third corner portion is positioned at an end portion of the bonding pattern on a far side from the first edge, wherein the bonding pattern includes a first area including the first corner portion and a second area including the second corner portion and the third corner portion, and wherein an application amount of the powder adhesive per unit area in the second area is greater than an application amount of the powder adhesive per unit area in the first area.

According to another aspect of the invention, an image forming apparatus includes an image forming unit configured to form a visible image and a bonding pattern on a sheet, the bonding pattern being formed of powder adhesive and to be used to bond sheets together, and a bonding unit configured to heat a plurality of sheets in a stacked state, to bond the plurality of sheets together via the bonding pattern, wherein the bonding pattern includes a first side portion, a second side portion, a third side portion, a fourth side portion, a first corner portion connecting the first side portion and the second side portion, a second corner portion connecting the first side portion and the fourth side portion, a third corner portion connecting the third side portion and the second side portion, and a fourth corner portion connecting the third side portion and the fourth side portion, wherein the bonding pattern is extended in a long and narrow shape along a first edge of the sheet, wherein the first side portion is extended along the first edge of the sheet, wherein in a direction in which a second edge of the sheet that intersects the first edge extends, the third side portion is positioned closer to a center of the sheet than the first side portion, wherein the third corner portion is curved such that a minimum value of a radius of curvature of the third corner portion is greater than a minimum value of a radius of curvature of the first corner portion and a minimum value of a radius of curvature of the second corner portion, and wherein the fourth corner portion is curved such that a minimum value of a radius of curvature of the fourth corner portion is greater than the minimum value of the radius of curvature of the first corner portion and the minimum value of the radius of curvature of the second corner portion.

Further features of the present invention will become apparent from the following description of exemplary embodiments with reference to the attached drawings.

DESCRIPTION OF THE EMBODIMENTS

Hereafter, embodiments according to the present disclosure will be described with reference to the drawings.

In the present disclosure, an "image forming apparatus" refers to an apparatus in general that is equipped with a function to form an image on a sheet serving as a recording material, i.e., recording medium. The image forming apparatus may be a single-function printer, a copying machine, or a multifunction device. The image forming apparatus may be an apparatus for mainly forming color images, or an apparatus for mainly forming monochrome images. Further, the image forming apparatus may be a system, i.e., image forming system, in which an auxiliary apparatus that is used integrally with the image forming apparatus body is connected to the image forming apparatus body for forming images on recording materials. Examples of the auxiliary apparatus include a sheet processing apparatus, i.e., finisher, for processing sheets on which images have been formed, a conveyance apparatus for conveying a sheet from the image forming apparatus body to other apparatuses, and a feeding apparatus, i.e., option feeder, for feeding sheets to the image forming apparatus body.

First Embodiment

Figure 1:
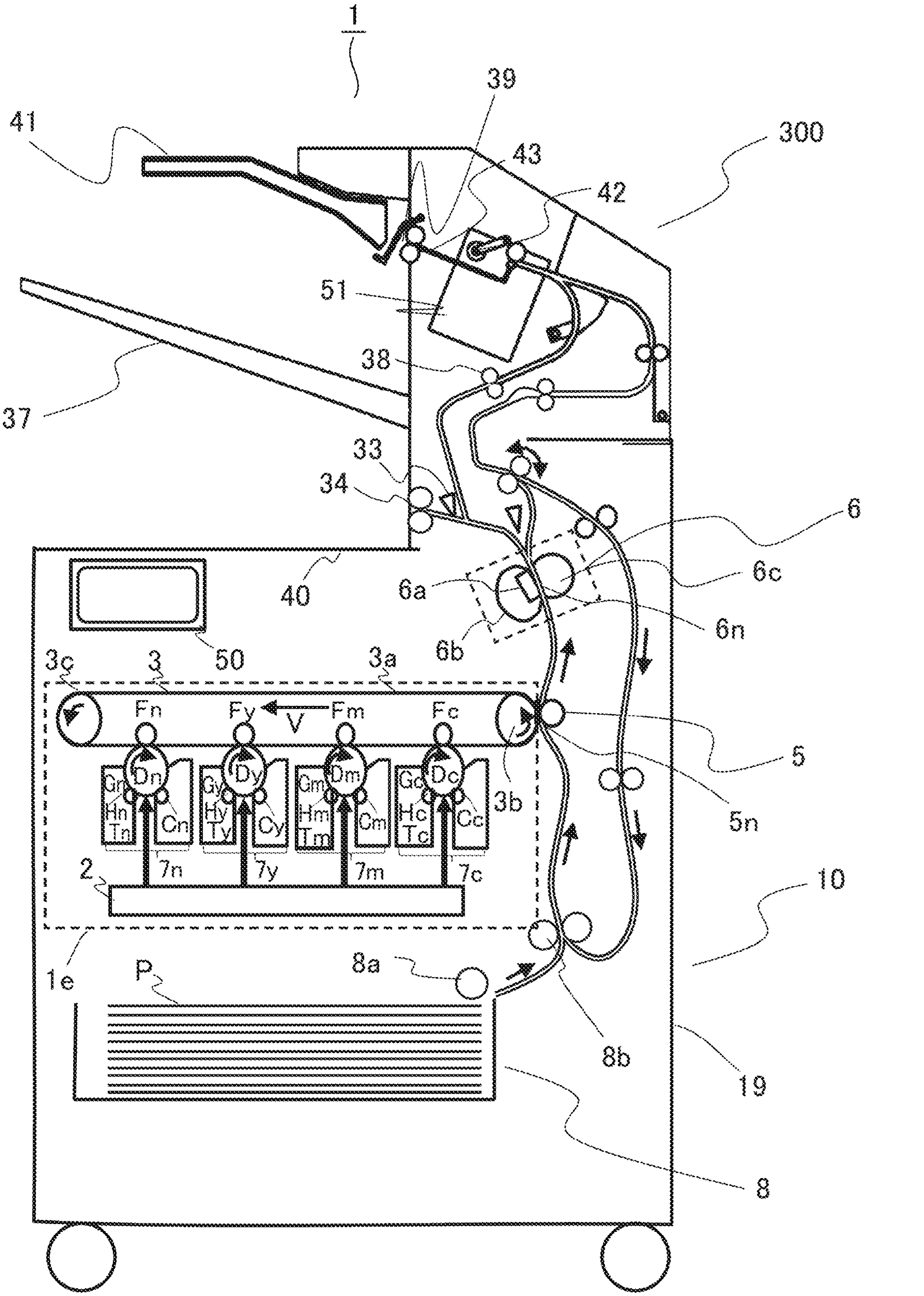
FIG. 1 is a schematic drawing of an image forming apparatus according to a first embodiment.

An overall configuration of an image forming apparatus 1 according to a first embodiment will be described with reference to FIG. 1. FIG. 1 is a schematic drawing illustrating a cross-sectional configuration of the image forming apparatus 1.

As illustrated in FIG. 1, the image forming apparatus 1 includes an image forming apparatus body (hereinafter referred to as an apparatus body 10), and a postprocessing apparatus 300. The image forming apparatus 1 may create a product, i.e., bonded printed product, in which, after forming images successively and one sheet at a time to a plurality of sheets P, the plurality of sheets P are bonded together.

The apparatus body 10 includes a sheet cassette 8 serving as a sheet storage portion that stores sheets P serving as recording material, an image forming unit 1*e* serving as an image forming portion, a fixing unit 6 serving as a fixing portion, and a casing 19 that accommodates these components. The image forming unit 1*e* is an example of an image forming portion that forms a visible image and a bonding pattern on a sheet. The bonding pattern is formed of powder adhesive and to be used to bond sheets together. The apparatus body 10 has a function to form a toner image on the sheet P fed from the sheet cassette 8 by the image forming unit 1*e*, and create a printed product that has been subjected to a fixing process by the fixing unit 6. The postprocessing apparatus 300 is a sheet processing apparatus that subjects the sheet P to which an image has been formed in the apparatus body 10 to a bonding process, i.e., binding process, or heat-and-pressure processing.

The sheet cassette 8 is inserted in a drawable manner to the casing 19 at a lower part of the apparatus body 10, and stores multiple sheets P. The sheets P stored in the sheet cassette 8 are fed from the sheet cassette 8 by a feed roller 8*a* serving as a feeding portion, and conveyed by a conveyance roller pair 8*b*. Examples of the sheet P include paper, such as normal paper and thick paper, a sheet material subjected to surface processing, such as coated paper, a sheet material having a special shape, such as an envelope or an index paper, and other various sheet materials with different sizes and materials, such as a plastic film and a cloth.

The image forming unit 1*e* according to the present embodiment is a tandem-type electrophotographic unit including four processing units 7*n*, 7*y*, 7*m*, and 7*c*, a scanner unit 2, and a transfer unit 3. The processing units 7*n*, 7*y*, 7*m*, and 7*c* may also be composed as units, i.e., processing cartridges, that enable a plurality of components that bear the image forming processes to be replaced integrally.

The processing units 7*n*, 7*y*, 7*m*, and 7*c* have approximately the same configuration, except for the different types of powder material, or toner, stored in four powder material storage portions Gn, Gy, Gm, and Gc. That is, the processing units 7*n*, 7*y*, 7*m*, and 7*c* respectively include photosensitive drums Dn, Dy, Dm, and Dc serving as image bearing members, charge rollers Cn, Cy, Cm, and Cc serving as chargers, and powder material storage portions Gn, Gy, Gm, and Gc that store powder material and supply the same to the photosensitive drum.

Among the four powder material storage portions, three powder material storage portions Gy, Gm, and Gc arranged on the right side in the drawing store three colored toner of yellow, magenta, and cyan serving as printing toner for mainly forming a visible image on the sheet P. Meanwhile, the powder material storage portion Gn on the leftmost side in the drawing stores powder adhesive Tn which is powder material, i.e., adhesive toner, for bonding the sheets together after the printing process.

In the present embodiment, a "toner image" created by the image forming unit 1*e* includes both a visible image formed by printing toner, and a pattern image, also referred to as bonding pattern, formed on an area which is set in advance on a sheet by powder adhesive, i.e., adhesive toner.

According to the present embodiment, in order to print a black image such as a text, process black formed by superposing yellow (Ty), magenta (Tm) and cyan (Tc) toner is used. However, it is possible to add a fifth processing unit containing black printing toner to the image forming unit 1*e* and enable a black image to be formed using black printing toner. The types and number of printing toner may be varied according to the purpose of use of the image forming apparatus 1.

The scanner unit 2 is arranged below the processing units 7*n*, 7*y*, 7*m*, and 7*c* and above the sheet cassette 8. The scanner unit 2 is an example of an exposure unit that exposes the photosensitive drums Dn, Dy, Dm, and Dc of respective processing units 7*n*, 7*y*, 7*m*, and 7*c* with laser light to form an electrostatic latent image.

The transfer unit 3 is equipped with a transfer belt 3*a* that serves as an intermediate transfer body, i.e., secondary image bearing member. The transfer belt 3*a* is a belt member wound around a secondary transfer inner roller 3*b* and a tension roller 3*c*, and an outer peripheral surface of the transfer belt 3*a* faces the photosensitive drums Dn, Dy, Dm, and Dc of the respective processing units 7*n*, 7*y*, 7*m*, and 7*c*. Primary transfer rollers Fn, Fy, Fm, and Fc are arranged at positions corresponding to respective photosensitive drums Dn, Dy, Dm, and Dc on the inner peripheral side of the transfer belt 3*a*. Further, a secondary transfer roller 5 serving as a transfer unit is arranged at a position facing the secondary transfer inner roller 3*b*. A transfer nip 5*n* formed between the secondary transfer roller 5 and the transfer belt 3*a* is a transfer portion, i.e., secondary transfer portion, where toner image is transferred from the transfer belt 3*a* to the sheet P.

The fixing unit 6 is a fixing unit that adopts a heat fixing system for heating the toner image on the sheet P and fixing the image onto the sheet P. The fixing unit 6 is arranged above the secondary transfer roller 5. The fixing unit 6 includes, for example, a ceramic heater 6*a* serving as a heat source, a heating film 6*b* serving as a fixing member, and a pressure roller 6*c* serving as a pressing member. The fixing member is not limited to the heating film 6*b* having flexibility, and it may be a cylindrical roller having stiffness, for example. The heat source may be a halogen lamp or a heat generation mechanism adopting an induction heating system.

The pressure roller 6*c* is driven to rotate by a driving unit not shown. The ceramic heater 6*a* is retained by a retaining member not shown, and pressed via an urging member such as a spring against the pressure roller 6*c* with the heating film 6*b* interposed therebetween. By this pressing force, a nip portion, i.e., fixing nip 6*n*, is formed between the heating film 6*b* and the pressure roller 6*c*. A temperature detecting element such as a thermistor is attached to the ceramic heater 6*a*. A control unit of the image forming apparatus 1 controls power supply to the ceramic heater 6*a* based on the detection signal of the temperature detecting element, by which front surface temperature of the heating film 6*b* is maintained at a predetermined target temperature suitable for fixing images.

Printing Toner

Conventionally-known printing toner may be used in the present embodiment. Among such toner, a printing toner that uses thermoplastic resin as binder resin is preferable. The thermoplastic resin is not specifically limited to a certain type of resin, and any type of thermoplastic resin that has been used conventionally as printing toner, such as polyester resin, vinyl resin, acrylic resin, and styrene-acrylic resin, may be used. The toner may contain a plurality of such resins. Among such resins, a printing toner using styrene-acrylic resin is specifically preferable. The printing toner may also contain a coloring agent, a magnetic body, a charge control agent, a wax, and an external additive.

Powder Adhesive

Powder adhesive containing thermoplastic resin as binding resin may be used in the present embodiment. The resin used for the thermoplastic resin is not specifically limited, and known thermoplastic resins, such as polyester resin, vinyl resin, acrylic resin, styrene-acrylic resin, polyethylene, polypropylene, polyolefin, ethylene-vinyl acetate copolymer resin, and ethylene-acrylic acid copolymer resin, may be used. The powder adhesive may also contain a plurality of these resins.

The powder adhesive may preferably further include wax. Known waxes, such as ester wax, which is an ester including alcohol and acid, or a hydrocarbon wax, such as paraffin wax, may be used.

The powder adhesive may contain a coloring agent. Known coloring agents such as black coloring agent, yellow coloring agent, magenta coloring agent, and cyan coloring agent, may be used. The content of the coloring agent within the powder adhesive is preferably 1.0 wt. % or less, and more preferably, 0.1 wt. % or less. The powder adhesive may also contain a magnetic body, a charge control agent, a wax, or an external additive.

In order to form a bonding pattern on the recording material using the electrophotographic system, a weight-average particle diameter of the powder adhesive is preferably 5.0 μm or more and 30 μm or less, and more preferably, 6.0 μm or more and 20 μm or less.

A printing toner may also be used as the powder adhesive, as long as the required adhesive property is satisfied. For example, according to the present embodiment, the processing unit 7*n* may use a black printing toner to form a black toner image, and in that case, the bonding pattern may be formed of one or more types of printing toner among yellow, magenta, cyan, and black printing toner.

Example of Preparation of Powder Adhesive

The powder adhesive was prepared, for example, by the following method.

styrene 75.0 parts n-butyl acrylate 25.0 parts polyester resin 4.0 parts (polyester resin with a weight-average molecular weight (Mw) of 20,000, a glass transition temperature (Tg) of 75° C., and an acid value of 8.2 mgKOH/g)

ethylene glycol distearate 14.0 parts (ester wax obtained by esterifying ethylene glycol and stearic acid)

hydrocarbon wax (HNP-9, product of Nippon Seiro Co., Ltd.) 2.0 parts divinylbenzene 0.5 parts A mixture having mixed the above materials was maintained at a temperature of 60° C., agitated at 500 rpm using a T. K. Homogenizing Mixer (product of Tokushu Kika Kogyo Co., Ltd.) and uniformly dissolved, by which a polymerizable monomer composition was prepared.

Meanwhile, 850.0 parts of 0.10 mol/L-$Na_3PO_4$ aqueous solution and 8.0 parts of 10% hydrochloric acid were added to a container equipped with a high speed agitation apparatus Clearmix (product of M Technique Co., Ltd.), which was heated to 70° C. with a rotation speed set to 15,000 rpm. Then, 127.5 parts of 1.0 mol/L-$CaCl_2$) aqueous solution was added to prepare an aqueous medium containing a calcium phosphate compound.

After putting the above-described polymerizable monomer composition into the aqueous medium, 7.0 parts of t-butyl peroxypivalate, which is a polymerization initiator, was added, and granulation was performed for 10 minutes while maintaining the rotation speed to 15,000 rpm. Thereafter, the agitator was changed from the high-speed agitator to a propeller-type agitator, and reaction was performed for five hours at 70° C. under reflux, before further reaction was performed for two hours with the solution temperature set to 85° C.

After completing the polymerization reaction, the acquired slurry was cooled, and hydrochloric acid was added to the slurry to adjust the pH to 1.4, which was agitated for one hour to dissolve calcium phosphate salt. Thereafter, washing was performed using an amount of water three times the amount of slurry, then filtering and drying was performed, and finally, classification was performed to obtain powder adhesive particles.

Thereafter, 2.0 parts of silica particulates (number particle average diameter of primary particles: 10 nm, BET specific surface area: 170 $m^2/g$) which had been subjected to hydrophobization treatment using dimethylsilicone oil (20 wt. %) was added as additive to 100.0 parts of powder adhesive particles. Then, the material was mixed for 15 minutes at 3,000 rpm using a Mitsui Henschel Mixer (product of Mitsui Miike Chemical Engineering Machinery Co., Ltd.) to obtain the powder adhesive.

The weight-average particle diameter of the powder adhesive being obtained by the above-described method was 6.8 μm.

Example of Preparation of Printing Toner

Printing Toner was prepared, for example, by the following method.

styrene 60.0 parts coloring agent 6.5 parts (C. I. Pigment Blue 15:3, product of Dainichiseika Color & Chemicals Mfg. Co., Ltd.)

The above materials were put into an attritor (product of Mitsui Miike Chemical Engineering Machinery Co., Ltd.), and zirconia particles having a diameter of 1.7 mm were used to perform dispersion for five hours by 220 rpm to obtain a pigment dispersion.

styrene 15.0 parts n-butyl acrylate 25.0 parts polyester resin 4.0 parts (polyester resin with a weight-average molecular weight (Mw) of 20,000, a glass transition temperature (Tg) of 75° C., and an acid value of 8.2 mgKOH/g)

behenyl behenate 12.0 parts (ester wax having esterified behenic acid and behenyl alcohol)

divinylbenzene 0.5 parts

The above materials were mixed and added to the pigment dispersion. The obtained mixture was maintained at a temperature of 60° C., agitated at 500 rpm using a T. K. Homogenizing Mixer (product of Tokushu Kika Kogyo Co., Ltd.), and uniformly dissolved and dispersed, by which a polymerizable monomer composition was prepared.

Meanwhile, 850.0 parts of 0.10 mol/L-$Na_3PO_4$ aqueous solution and 8.0 parts of 10% hydrochloric acid were added to a container equipped with a high-speed agitation apparatus Clearmix (product of M Technique Co., Ltd.), which was heated to 70° C. with a rotation speed set to 15,000 rpm. Then, 127.5 parts of 1.0 mol/L-$CaCl_2$) aqueous solution was added to the above to prepare an aqueous medium containing a calcium phosphate.

After putting the above-described polymerizable monomer composition into the aqueous medium, 7.0 parts of t-butyl peroxypivalate, which is a polymerization initiator, was added, and granulation was performed for 10 minutes while maintaining a rotation speed of 15,000 rpm. Thereafter, the agitator was changed from the high-speed agitator to a propeller-type agitator, reaction was performed for five hours at 70° C. under reflux, and then further reaction was performed for two hours with a solution temperature set to 85° C.

After completing the polymerization reaction, the obtained acquired slurry was cooled, and hydrochloric acid was added to the slurry to adjust the pH to 1.4, which was agitated for one hour to dissolve calcium phosphate salt. Thereafter, washing was performed using an amount of water three times the amount of slurry, then filtering and drying was performed, and finally, classification was performed to obtain toner particles.

Thereafter, 2.0 parts of silica particulates (number particle average diameter of primary particles: 10 nm, BET specific surface area: 170 $m^2/g$) having been subjected to hydrophobization treatment using dimethylsilicone oil (20 wt. %) was added as additive to 100.0 parts of toner particles. Then, the material was mixed for 15 minutes at 3,000 rpm using a Mitsui Henschel Mixer (product of Mitsui Miike Chemical Engineering Machinery Co., Ltd.) to obtain toner.

The weight-average particle diameter of the obtained printing toner was 6.5 μm.

Method for Measuring Weight-Average Particle Diameter

The weight-average particle diameter of the printing toner and the powder adhesive were obtained by the following method.

A precise particle size distribution measurement device called "Coulter Counter Multisizer 3" (Registered Trademark tradename, product of Beckman Coulter, Inc.) that adopts an aperture electrical resistance method using a 100-μm aperture tube was used as a measurement device. A specialized software of the device called "Beckman Coulter Multisizer 3 Version 3.51" (product of Beckman Coulter, Inc.) was used for setting measurement conditions and analyzing measurement data. Number of effective measurement channels for the measurement was set to 25,000 channels.

Electrolyte solution having analytical grade sodium chloride dissolved in ion exchanged water with a concentration set to 1 wt. %, such as "ISOTON II" (product of Beckman Coulter, Inc.) may be used as the electrolyte solution used for the measurement.

Prior to performing measurement and analysis, setting of the specialized software is performed as described below. On "change standard measurement method (SOM)" screen of the specialized software, a total number of counts of a control mode is set to 50,000 particles, the number of times of measurement is set to once, and a value obtained using "standard particles 10.0 μm" (product of Beckman Coulter, Inc.) is set as Kd value. By clicking on a "button for measuring threshold/noise level", the threshold and the noise level are set automatically. Further, current is set to 1,600 μA, gain is set to 2, electrolyte is set to ISOTON II, and a check mark is entered in a box for "flush aperture tube after measurement".

On a "set conversion from pulse to particle diameter" screen of the specialized software, a bin interval is set to logarithmic particle diameter, particle diameter bin is set to 256 particle diameter bins, and particle diameter range is set from 2 μm to 60 μm.

An actual measurement method is as described below.

(1) 200 mL of electrolyte solution is poured into a 250-mL round-bottom beaker made of glass dedicated for use in Multisizer 3, the beaker is set on a sample stand, and agitation of stirrer rod is performed in a counterclockwise direction at 24 rps. Then, using the "flushing of aperture tube" function of the specialized software, soiling and air bubbles in the aperture tubes are removed.

(2) 30 mL of electrolyte solution is poured into a 100-mL flat-bottom beaker made of glass. 0.3 mL of diluent obtained by diluting "Contaminon N" (Registered Trademark) (10 wt. % aqueous solution of neutral detergent of pH7 for washing precise measuring device composed of nonionic surfactant, anionic surfactant and organic builder, product of Wako Pure Chemical Industries, Ltd.) in ion exchanged water to three times by mass is added as dispersant.

(3) An ultrasonic dispersion device "Ultrasonic Dispersion System Tetora 150" (product of Nikkaki Bios Co., Ltd.) with an electrical output of 120 W is prepared, in which two oscillators with an oscillating frequency of 50 kHz are installed with a 180-phase difference. 3.3 L of ion exchanged water is poured into a tank of the ultrasonic dispersion device, and 2 mL of Contaminon N is added to the tank.

(4) The beaker mentioned in (2) is set to a beaker fixing hole of the ultrasonic dispersion device, and the ultrasonic dispersion device is activated. The height position of the beaker is set so that a resonant state of liquid level of the electrolyte solution within the beaker is maximized.

(5) Toner or powder adhesive is added and dispersed a little at a time to the electrolyte solution until a total amount of 10 mg is obtained while irradiating ultrasonic waves to the electrolyte solution in the beaker of (4). Then, ultrasonic wave dispersion processing is continued further for 60 seconds. During ultrasonic wave dispersion, the solution temperature in the tank is controlled to fall between 10° C. and 40° C.

(6) The electrolyte solution mentioned in (5) in which toner or powder adhesive is dispersed is dripped using a pipette to the round-bottom beaker mentioned in (1) placed on the sample stand, so that a measurement concentration of 5% is obtained. Then, measurement is performed until the number of measured particles reaches 50,000.

(7) Measurement data is analyzed using the specialized software attached to the device, and weight-average particle diameter is calculated.

Image Forming Operation

An image forming operation performed by the apparatus body 10 will be described. When a visible image data and an image forming instruction are entered to the image forming apparatus 1, a control unit (not shown) of the image forming apparatus 1 starts to execute an image forming job. The image forming job is a sequence of tasks including an image forming operation of forming a visible image, and if necessary, a bonding pattern, while conveying the sheets P one by one, and a bonding operation of sheets in the postprocessing apparatus 300. When sending an image forming instruction to the image forming apparatus 1, the user enters in advance a setting information regarding whether bonding by the postprocessing apparatus 300 is necessary.

In the image forming operation, at first, the sheets P are fed one by one from the sheet cassette 8 and conveyed via the conveyance roller pair 8*b* toward the transfer nip 5*n*. In parallel with the feeding of the sheet P, the processing units 7*n*, 7*y*, 7*m*, and 7*c* are driven sequentially, and the photosensitive drums Dn, Dy, Dm, and Dc are driven to rotate. The charge rollers Cn, Cy, Cm, and Cc uniformly charge the surface of the photosensitive drums Dn, Dy, Dm, and Dc to a predetermined polarity and potential. The scanner unit 2 irradiates the respective photosensitive drums Dn, Dy, Dm, and Dc with a laser light that has been modulated based on the visible image data, and forms electrostatic latent images on the surfaces of the photosensitive drums Dn, Dy, Dm, and Dc. Developing rollers Hn, Hy, Hm, and Hc bear powder material, i.e., printing toner or powder adhesive, stored in the powder material storage portions Gn, Gy, Gm, and Gc and supply the same to the photosensitive drums Dn, Dy, Dm, and Dc, by which the electrostatic latent images are developed into an image constituted by powder material, i.e., toner image.

The powder adhesive layer formed on the photosensitive drum Dn by being developed using the powder adhesive Tn differs from the toner images, i.e., visible images, of printing toner that records images such as figures and texts on the sheet P in that it does not aim at transmitting visible information. However, in the following description, the pattern image formed by the powder adhesive Tn, hereinafter referred to as bonding pattern, is also handled as one of the toner images. The bonding pattern is a layer of the powder adhesive Tn formed in a predetermined area, i.e., bonding area, of the sheet P being the target of a bonding process.

The transfer belt 3*a* rotates in a counterclockwise direction (arrow v) in the drawing. The toner images formed by each of the processing units 7*n*, 7*y*, 7*m*, and 7*c* are primarily transferred from the photosensitive drums Dn, Dy, Dm, and Dc to the transfer belt 3*a* by electric fields formed between the photosensitive drums Dn, Dy, Dm, and Dc and the primary transfer rollers Fn, Fy, Fm, and Fc. The toner image borne on the transfer belt 3*a* and having reached the transfer nip 5*n* is secondarily transferred to the conveyed sheet P by an electric field formed between the secondary transfer roller 5 and the secondary transfer inner roller 3*b*. Thereby, a visible image and a bonding pattern are transferred to the sheet P.

Thereafter, the sheet P is conveyed to the fixing unit 6 and is subjected to a fixing process. That is, when the sheet P passes through the fixing nip 6*n*, the toner image on the sheet P is heated and pressed, by which the printing toner Ty, Tm, and Tc and the powder adhesive Tn are melted and then solidified, by which a toner image fixed to the sheet P may be obtained.

If the bonding processing of the sheet P is not performed, a bonding pattern of the powder adhesive Tn is not formed on the sheet P. In this case, a switch guide 33 guides the sheet P toward a discharge roller pair 34. The discharge roller pair 34 discharges the sheet P onto a discharge tray 40, and the image forming apparatus 1 ends the operation regarding the sheet P.

Meanwhile, if the bonding processing of the sheet P is performed, a bonding pattern of the powder adhesive Tn is formed on the sheet P. The switch guide 33 guides the sheet P to a conveyance roller pair 38 of the postprocessing apparatus 300. After stacking and aligning a plurality of sheets P, the postprocessing apparatus 300 performs a heat-and-pressure processing, i.e., bonding processing, by a heat-and-pressure bonding unit 51. Thereby, a sheet bundle in which sheets are bonded together via the bonding pattern formed by the powder adhesive Tn is created. The postprocessing apparatus 300 discharges the bonded sheet bundle as a product onto a discharge tray 37.

Postprocessing Apparatus

The postprocessing apparatus 300 will be described. The postprocessing apparatus 300 is a sheet bonding apparatus that is capable of bonding sheets together by heat-and-pressure bonding of the sheet P on which a bonding pattern is formed in advance. The postprocessing apparatus 300 according to the present embodiment is arranged at an upper portion of the apparatus body 10. The postprocessing apparatus 300 may be accommodated within a common casing as the apparatus body 10, or may be accommodated in a different casing as the casing of the apparatus body 10 connected to an upper side of the casing of the apparatus body 10.

As illustrated in FIG. 1, the postprocessing apparatus 300 includes conveyance roller pairs 38 and 39, a width-direction alignment portion 41, a conveyance-direction alignment portion 42, an intermediate supporting portion 43, the heat-and-pressure bonding unit 51, and the discharge tray 37. In the following description, a sheet conveyance direction may be referred to as a "longitudinal direction", and a width direction orthogonal to the sheet conveyance direction may be referred to as a "lateral direction".

The intermediate supporting portion 43 is a place, i.e., processing tray, where a plurality of sheets P serving as a target of the bonding process are supported. The conveyance-direction alignment portion 42 and the width-direction alignment portion 41 are examples of an alignment unit that align the sheets P supported on the intermediate supporting portion 43 to a position where the heat-and-pressure bonding operation by the heat-and-pressure bonding unit 51 is performed. The conveyance-direction alignment portion 42 is a roller that coneys the sheet P toward a reference plate that is disposed on an upstream edge of the intermediate supporting portion 43 in the sheet conveyance direction. The width-direction alignment portion 41 is a pair of aligning plates that face each other in the width direction orthogonal to the sheet conveyance direction. The aligning plates are formed in a rectangular shape with one side open toward an inner side in the width direction, and align the sheet Pin the width direction by having one aligning plate moved with respect to the other aligning plate serving as reference. The conveyance roller pair 39 is capable of being switched to a nip state in which a nip portion for nipping the sheet P is formed and a release state, i.e., separated state, in which the nip portion is released. The details of the heat-and-pressure bonding unit 51 will be described below.

The sheet P guided to the postprocessing apparatus 300 by the switch guide 33 is conveyed by the conveyance roller pair 38 toward the intermediate supporting portion 43, and is supported on the intermediate supporting portion 43. When the sheet P is supported on the intermediate supporting portion 43, the conveyance roller pair 39 stands by in the release state. The sheet P supported on the intermediate supporting portion 43 is aligned in the width direction by the width-direction alignment portion 41, and thereafter, aligned in the sheet conveyance direction by the conveyance-direction alignment portion 42. That is, the respective sheets P are aligned in the longitudinal direction and the lateral direction by the intermediate supporting portion 43.

When a predetermined number of sheets P, i.e., the number of sheets P that constitute one product, are supported and aligned, the heat-and-pressure bonding unit 51 performs a heat-and-pressure processing of heating and pressing the predetermined number of sheets P. The heat-and-pressure bonding unit 51 is an example of a bonding unit that bonds a plurality of sheets by heating the bonding pattern of a plurality of sheets being in a stacked state. Thereby, the bonding pattern is reheated, and a sheet bundle in which sheet surfaces facing each other of the predetermined number of sheets P are bonded via a layer of powder adhesive Tn, i.e., bonding layer, is created. After the heat-and-pressure processing is completed, the conveyance roller pair 39 is switched to the nip state and driven to rotate, thereby nipping the sheet bundle and discharging the same from the intermediate supporting portion 43 to the discharge tray 37.

Heat-and-Pressure Bonding Unit

Figure 2:
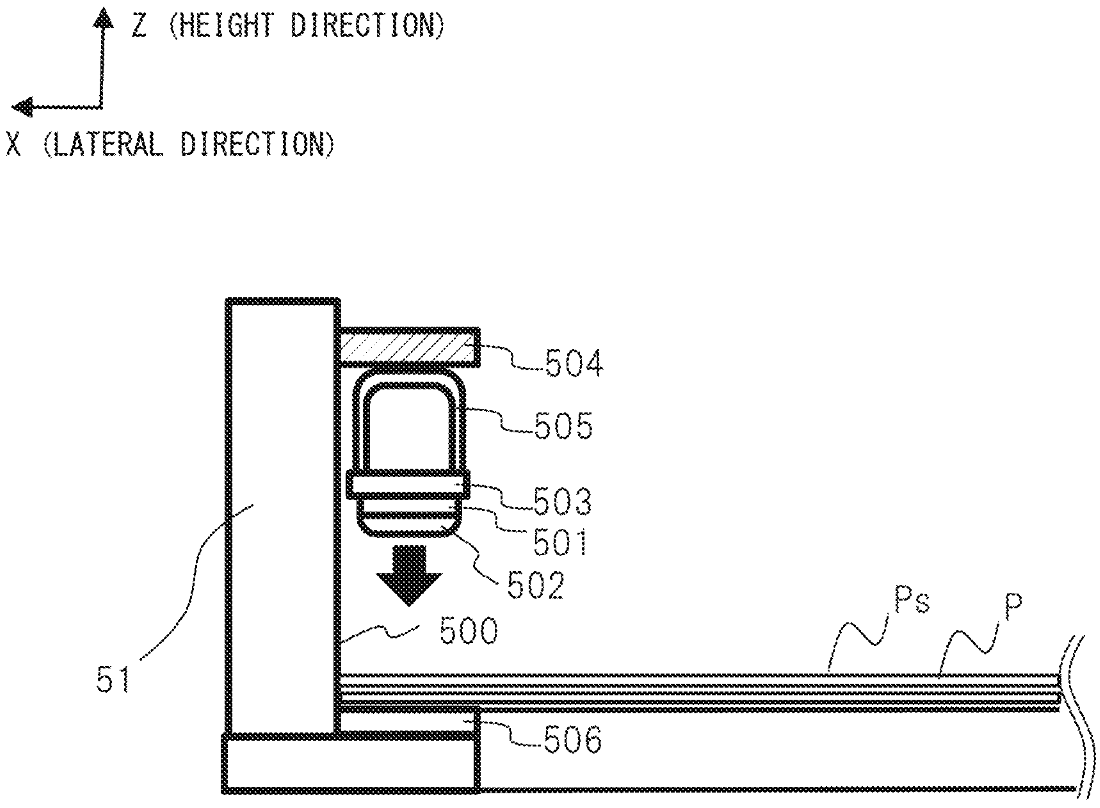
FIG. 2 is a schematic drawing of a heat fixing unit according to the first embodiment.

The heat-and-pressure bonding unit 51 will be described in further detail. FIG. 2 is a cross-sectional view of the heat-and-pressure bonding unit 51. In FIG. 2, a width direction is illustrated by an arrow X, and a height direction orthogonal to both the sheet conveyance direction and the width direction, i.e., thickness direction of the sheet P, is illustrated by an arrow Z.

The heat-and-pressure bonding unit 51 includes a heater 501, a heating plate 502, a supporting body 503, a pressing lever 504, a metal stay 505, and a supporting plate 506.

The heating plate 502, i.e., first pressing member, is a member, i.e., heating member, that nips a bundle of sheets P, i.e., sheet bundle Ps, serving as a processing target together with the supporting plate 506, i.e., second pressing member, and applies heat and pressure thereto. The heating plate 502 has a contact portion that comes into contact with an upper surface of the sheet bundle Ps, and a surface of the heating plate 502 opposite to the contact portion in the height direction comes into contact with the heater 501. The heating plate 502 according to the present embodiment is an aluminum plate having a thickness of 1.5 mm.

The heater 501 is a heat source that heats the heating plate 502. The heater 501 according to the present embodiment is a ceramic heater in which a resistance heating element pattern is formed on a ceramic substrate having a thickness of 1.0 mm.

The supporting body 503 supports the heater 501. The supporting body 503 according to the present embodiment is made of heat resistant resin. A temperature detecting element, such as a thermistor, serving as a temperature detecting unit for detecting the temperature of the heater 501, and an electric circuit for supplying power to the heater 501 are disposed on the supporting body 503. The control unit of the image forming apparatus 1 controls the power supply to the heater 501 based on a detection signal of the temperature detecting element, by which the heating plate 502 is maintained at a temperature suitable for performing heat-and-pressure bonding of the sheet bundle Ps. The control unit maintains the heater 501 to 240° C., which is a target temperature of the heater 501, such that a surface temperature of the heating plate 502 becomes 200° C.

The metal stay 505 supports the supporting body 503. The metal stay 505 moves by receiving force from the pressing lever 504 that moves in a height direction by receiving driving force from a driving source. The heating plate 502, the heater 501, the supporting body 503, and the metal stay 505 are a unit, i.e., heating unit, that moves integrally in the height direction. The metal stay 505 has a high stiffness so as to transmit the driving force of the pressing lever 504 uniformly to the heating unit.

The supporting plate 506 is a silicone rubber plate having a thickness of 2.0 mm, for example. The supporting plate 506 is fixed to a frame body of the heat-and-pressure bonding unit 51, and the heating plate 502 receives the force that presses the sheet bundle Ps downward in the drawing.

The heating plate 502 is pressed against an upper surface of the sheet bundle Ps by being pressed downward by the pressing lever 504 via the metal stay 505, the supporting body 503, and the heater 501. In the present embodiment, a pressing force that the sheet bundle Ps receives is set to 0.2 MPa in average pressure, i.e., average surface pressure, within a pressurizing range of the heating plate 502, i.e., contact area between the heating plate 502 and the upper surface of the sheet bundle Ps. In the heat-and-pressure bonding operation, the heat-and-pressure bonding unit 51 is driven such that the heating plate 502 separates from the sheet bundle Ps after pressing the sheet bundle Ps for two seconds.

In the present embodiment, a pressing range of the heating plate 502 is a triangle shape that is 13 mm in the X direction, i.e., width direction or lateral direction, and 25 mm in the Y direction, i.e., sheet conveyance direction or longitudinal direction. The pressing range may be a right-angled triangle shape in which the 13-mm edge in the lateral direction and the 25-mm edge in the Y direction intersect orthogonally.

Bonding Pattern

Figure 3:
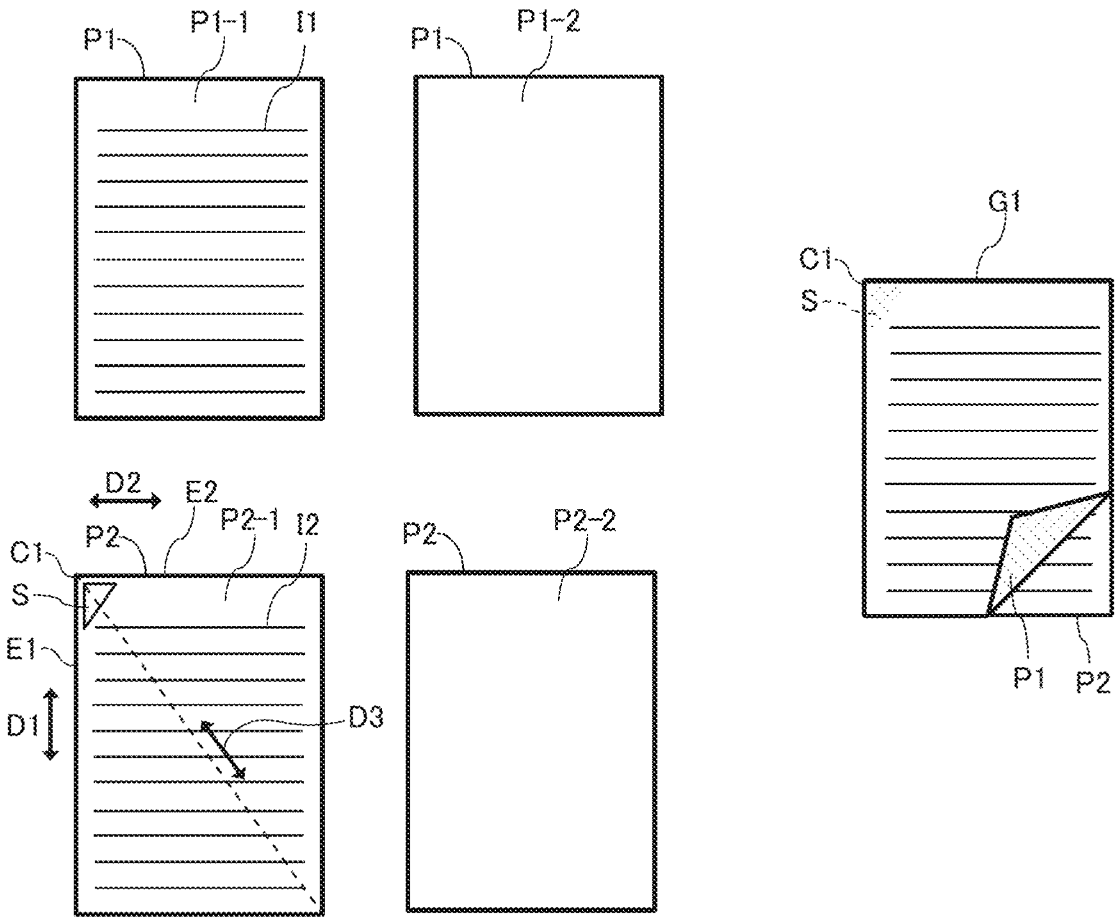
FIG. 3 is a view illustrating an example of a product according to the first embodiment.

FIG. 3 is a schematic diagram illustrating visible images I1 and I2 and a bonding pattern S when creating a product G1 which is a bonded printed product in which two sheets P1 and P2 are corner-bound. The first sheet P1 includes a front surface P1-1 that forms a front cover of the product G1, and a rear surface P1-2. The second sheet P2 includes a front surface P2-1 that faces the first rear surface P1-2, and a rear surface P2-2 that forms a rear cover of the product G1. In this example, on the first and second front surfaces P1-1 and P2-2 are respectively formed visible images J1 and J2, and the rear surfaces P1-2 and P2-2 are blank sheets. The visible images I1 and I2 are formed using at least one of the printing toners Ty, Tm, and Tc.

The bonding pattern S illustrated by a halftone-dotted area in the drawing is formed on a predetermined area on the front surface P2-1 of the second sheet P2 using the powder adhesive Tn. In the present embodiment, the bonding pattern S is formed near one corner portion, i.e., upper left corner in the drawing, of the sheet P2. The shape of the bonding pattern S is stored in advance in a storage portion provided in the control unit of the image forming apparatus 1. It may be possible to allow the user to select or newly set a shape of the bonding pattern S. A detailed shape of the bonding pattern S will be described in detail below.

The postprocessing apparatus 300 performs heat-and-pressure processing by the heat-and-pressure bonding unit 51 to two sheets P1 and P2 which are in a stacked state, by which a corner-bound product G1 in which the sheets P1 and P2 are bound at the corner portion is created.

Details of Bonding Pattern

The bonding pattern S will be described in detail. The powder adhesive Tn is applied based on shapes of bonding patterns S-1, S-2, S-3, S-4, and S-5 as illustrated in FIGS. 4A to 4E. Hereinafter, the bonding patterns S-1, S-2, S-3, S-4, and S-5 illustrated in FIGS. 4A to 4E are collectively referred to as the respective bonding patterns S.

At first, a shape common to the respective bonding patterns S will be described. A contour of the bonding pattern S is an approximately triangle shape having three side portions, i.e., edges, and three corner portions. The bonding pattern S includes a first side portion Se1, a second side portion Se2, and a third side portion Se3. Further, the bonding pattern S includes a first corner portion Sc1 that connects the first side portion Se1 and the second side portion Se2, a second corner portion Sc2 that connects the first side portion Se1 and the third side portion Se3, and a third corner portion Sc3 that connects the second side portion Se2 and the third side portion Se3.

In a diagonal direction D3 of the sheet P on which the bonding pattern S is formed, i.e., the sheet P2 of FIG. 3, the first corner portion Sc1 is positioned at an end portion of the bonding pattern S on a near side to a corner C1 of the sheet P. The diagonal direction D3 is a direction of a diagonal line of the sheet P that passes the corner C1 where a first edge E1 and a second edge E2 of the sheet P intersect. The second corner portion Sc2 is positioned at an end portion of the bonding pattern S on a far side from the second edge E2 in a direction D1 of the first edge E1 of the sheet P. The third corner portion Sc3 is positioned at an end portion of the bonding pattern S on a far side from the first edge E1 in the direction of the second edge E2 of the sheet P.

In the respective bonding patterns S, the second corner portion Sc2 and the third corner portion Sc3 are curved such that a minimum value of a radius of curvature of the second corner portion Sc2 and a minimum value of a radius of curvature of the third corner portion Sc3 are greater than a minimum value of a radius of curvature of the first corner portion Sc1. When the minimum value of the radius of curvature of the first corner portion Sc1 is denoted by R1 (mm), the minimum value of the radius of curvature of the second corner portion Sc2 is denoted by R2 (mm), and the minimum value of the radius of curvature of the third corner portion Sc3 is denoted by R3 (mm), $R1<R2$ and $R2<R3$ are satisfied. In other words, the respective bonding patterns S have the second corner portion Sc2 and the third corner portion Sc3 which are close to a center area of the sheet P on which the visible image is mainly formed rounded such that it has a curved shape, i.e., rounded shape, that is gently curved compared to the first corner portion Sc1 positioned close to the corner portion of the sheet P.

If the corner-bound product G1 bonded at the corner C1 as illustrated in FIG. 3 is formed, it is possible to assume that the user turns over the sheets P1 from the lower right toward the upper left, or from right to left, or from the lower side toward the upper side. In that case, a stress in a direction causing the sheets P1 and P2 to be peeled off, that is, a tensile force in a thickness direction of the sheet, occurs at the second corner portion Sc2 and the third corner portion Sc3 of the bonding pattern S. If the second corner portion Sc2 and the third corner portion Sc3 are formed as an acute angle, i.e., a corner at which the adjacent side portions intersect at one point, stress may concentrate at the corner and the bonding pattern S may tend to be peeled therefrom.

According to the present embodiment, concentration of stress may be avoided by having the second corner portion Sc2 and the third corner portion Sc3 rounded. Therefore, when the user turns over the sheet of the product G1 by a normal method of use, the possibility of the sheets P1 and P2 being peeled off may be reduced. That is, according to the present embodiment, unintentional peeling of sheets may be reduced.

Meanwhile, the first corner portion Sc1 has a smaller minimum value of the radius of curvature than the second corner portion Sc2 and the third corner portion Sc3, such that stress tends to concentrate thereto, which may easily cause the peeling of the bonding pattern S. Therefore, there is an advantage in that if the user wishes to peel off the sheets P1 and P2, the user may turn over the sheet P1 from the corner C1 of the product G1 to cause the sheets P1 and P2 to be peeled off easily.

The first side portion Se1, the second side portion Se2, and the third side portion Se3 may be a straight line shape or a curved line shape. The second corner portion Sc2 and the third corner portion Sc3 may be a curved line having an arc shape, or may be a curved line having other shapes. The first corner portion Sc1 may be a corner at which the first side portion Se1 having a straight line shape and the second side portion Se2 having a straight line shape intersect at right angles at one point, or it may be a rounded corner composed of a curved line.

Figure 4A:
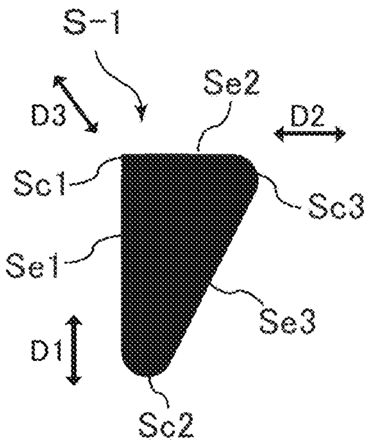
FIGS. 4A to 4E are each a view illustrating a bonding pattern according to the first embodiment.
Figure 4B:
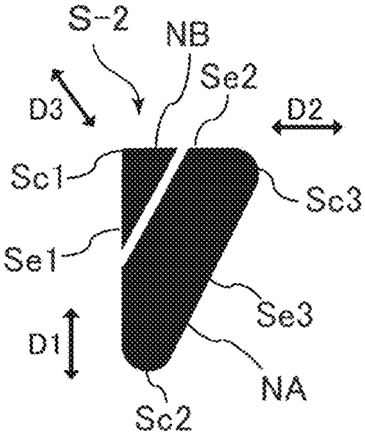
Figure 4C:
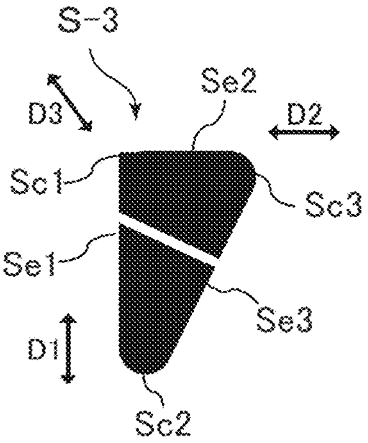

In the case of the bonding patterns S-1 to S-3 of FIGS. 4A to 4C in which the first side portion Se1, the second side portion Se2, and the third side portion Se3 have a straight line shape, a curved line portion having a curved or bent shape that connects adjacent side portions is referred to as the corner portion of the bonding pattern S. Meanwhile, in the case of FIGS. 4D and 4E in which at least one of the first side portion Se1, the second side portion Se2, and the third side portion Se3 has a curved line shape, it may be difficult to define a curved line portion as the corner portion and distinguish the curved portion from the side portions. In that case, the corner portion of the bonding pattern S is defined as a portion of a circumference of the bonding pattern S where the radius of curvature takes a minimal value, or a bent portion.

Figure 4D:
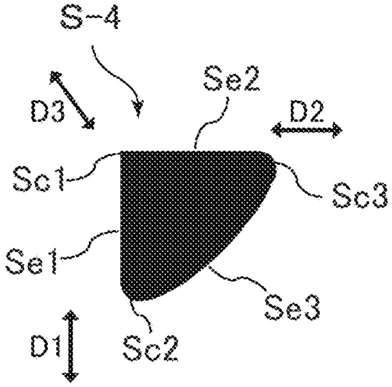

Specifically, in the example of FIG. 4D, the third side portion Se3 has a curved line shape. In this case, the second corner portion Sc2 of the bonding pattern S-4 is a portion where the radius of curvature of the circumference of the bonding pattern S-4 takes the minimal value at an end portion of the bonding pattern S-4 on a far side from the second edge E2 in the direction D1 of the first edge E1 of the sheet P. The third corner portion Sc3 of the bonding pattern S-4 is a portion where the radius of curvature of the circumference of the bonding pattern S-4 takes the minimal value at an end portion of the bonding pattern S-4 on a far side from the first edge E1 in a direction D2 of the second edge E2 of the sheet P.

Figure 4E:
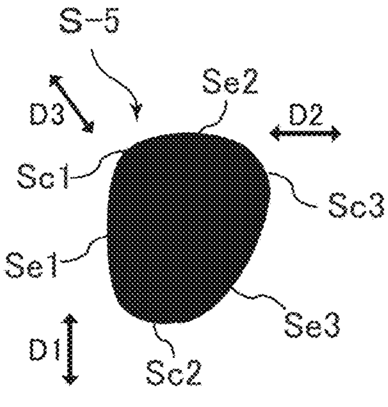

Further according to the example of FIG. 4E, the first side portion Se1, the second side portion Se2, and the third side portion Se3 all have curve line shapes. In that case, the first corner portion Sc1 of the bonding pattern S-5 is a portion where the radius of curvature of the circumference of the bonding pattern S-5 takes the minimal value at an end portion of the bonding pattern S on a near side to the corner C1 of the sheet P in the diagonal direction D3 of the sheet P. The second corner portion Sc2 of the bonding pattern S-5 is a portion where the radius of curvature of the circumference of the bonding pattern S-5 takes the minimal value at an end portion of the bonding pattern S on a far side from the second edge E2 in the direction D1 of the first edge E1 of the sheet P. The third corner portion Sc3 of the bonding pattern S-5 is a portion where the radius of curvature of the circumference of the bonding pattern S takes the minimal value at an end portion of the bonding pattern S-5 on a far side from the first edge E1 in the direction D2 of the second edge E2 of the sheet P.

The specific shape of each of the bonding patterns S of FIGS. 4A to 4E will be described. The bonding pattern S-1 of FIG. 4A has an approximately right-angled triangle shape whose hypotenuse is formed by the third side portion Se3. That is, the first side portion Se1, the second side portion Se2, and the third side portion Se3 each extend straightly and are arranged to form a right-angled triangle in which the first side portion Se1 and the second side portion Se2 intersect orthogonally at a first corner portion Sc2 and whose hypotenuse is an extended line of the third side portion Se3. The second corner portion Sc2 and the third corner portion Sc3 are each a curved line in which an acute angle of the right-angled triangle is rounded in an arc shape. According to such a shape, unintended peeling of sheets may be reduced. Further, sheets may easily be peeled from the corner C1 side of the product G1.

The bonding pattern S-2 of FIG. 4B has a similar right-angled triangle contour as the bonding pattern S-1 of FIG. 4A. However, the bonding pattern S-2 has the application area of the powder adhesive Tn divided into an area NB, i.e., first area, including the first corner portion Sc1 and an area NA, i.e., second area, including the second corner portion Sc2 and the third corner portion Sc3. A gap may be set between the area NA and the area NB, or the two areas may be adjacent each other. As described in the third embodiment below, an application amount of the powder adhesive Tn, i.e., weight of the powder adhesive Tn per unit area, so-called toner application amount, in the area NA may be greater than the application amount of the powder adhesive Tn in the area NB. In that case, the effect of enabling the sheet to be easily peeled off from the corner C1 side of the product G1 may be enhanced while enhancing the effect of reducing unintended peeling of sheets.

The bonding pattern S-3 of FIG. 4C has a similar right-angled triangle shape contour as the bonding pattern S-1 of FIG. 4A. However, the bonding pattern S-3 has the application area of the powder adhesive Tn divided into an area including the first corner portion Sc1 and the third corner portion Sc3 and an area including the second corner portion Sc2. Even according to such a pattern, the unintended peeling of sheets may be reduced.

The bonding pattern S-4 of FIG. 4D has the third side portion Se3 formed in a curved line shape. The first side portion Se1 and the second side portion Se2 have a straight line shape, and they intersect each other at the first corner portion Sc1. The third side portion Se3 is preferably formed in a curved line shape that is curved to project toward the center side, i.e., face center side, of the sheet P in the diagonal direction D3. The third side portion Se3 may be a part of an arc shape or an oval. Even according to this pattern, unintended peeling of sheets may be reduced.

The bonding pattern S-4 of FIG. 4E has each of the first side portion Se1, the second side portion Se2, and the third side portion Se3 formed in a curved line shape, and forms an approximately triangle shape as a whole. Each side portion may be a curved line shape that is curved to project toward the outer side of the approximately triangle shape. Even according to this pattern, unintended peeling of sheets may be reduced.

The bonding patterns S-1 to S-5 described above are mere examples, and the bonding pattern S may adopt a shape that differs from those illustrated in FIGS. 4A to 4E.

Bonding Strength Measurement by Tensilon Tester

In order to confirm that unintended peeling of sheets may be reduced according to the bonding pattern S of the present embodiment, bonding strength was measured by the following method. At first, a bonding pattern was formed on one of two sheets for testing using the powder adhesive Tn, and the sheets were bonded together through heat-and-pressure bonding. The sheets having been subjected to heat-and-pressure bonding was cut into a size having an overall length of 100 mm and an overall width of 20 mm to form a sample piece. A bonding area of the sample piece was formed to include a corner portion of the bonding pattern S, such as the second corner portion Sc2 of the bonding pattern S illustrated in FIG. 4A. Further, a plurality of sample pieces each having different radius of curvatures R of the corner portions were prepared. The bonding strengths of the sample pieces were measured using a Tensilon tester RTG-1225, which is a product of A&D Company, Limited. Confirmation of gradient of an initial rising portion in a tension-strain curved line obtained under room temperature (23° C.) at a test speed of 50 mm/min was performed. That is, the bonding strength of sheets according to the present embodiment is a magnitude of inclination of a tangent of the curved line immediately before the end portion of the bonding pattern S starts to peel in the tension-strain curved line mentioned above that indicates the magnitude of load when pulling and peeling off the sheets. The initial rising portion may be determined based on a strain amount, that is, a distance in which the sample piece is pulled, of a state where starting of peeling of the end portion of the bonding pattern S is confirmed visually. For example, according to the measurement results illustrated in FIG. 12, a range of distance from 0 mm to 5 mm may be set as the initial rising portion.

Figure 12:
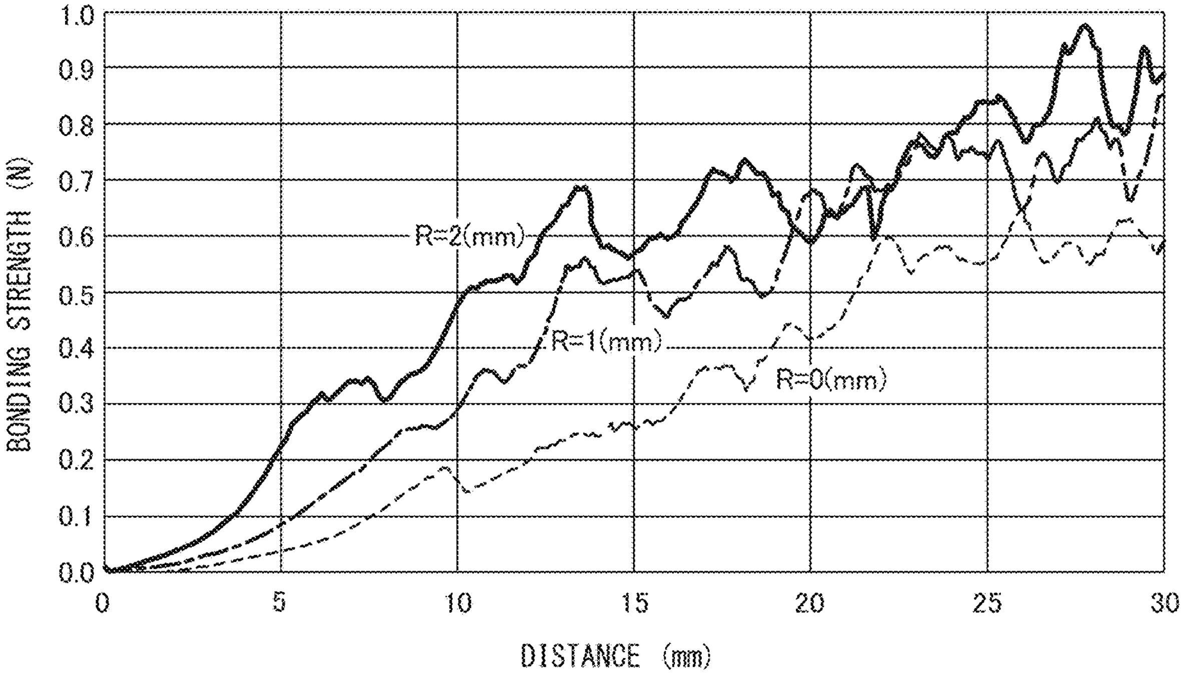
FIG. 12 is a graph illustrating a relationship between a shape of a corner portion of the bonding pattern and bonding strength.

The graph of FIG. 12 shows the results of measurement of bonding strengths of sample pieces with the radius of curvature R (mm) of the corner portions set to three levels, which are R=0 (no rounding), R=1, and R=2. Based on the graph of R=1 and R=0, it can be recognized that the bonding strength of the sheet pieces is increased by rounding the corner portion of the bonding pattern S. Further, based on the graph of R=2 and R=1, it can be recognized that the bonding strength of the sheet piece is higher when the radius of curvature of the corner portion is set to 2 mm than when it is set to 1 mm.

That is, when a bonding pattern S having an approximately triangle shape is formed at the corner portion of the sheet P for corner-bonding, a minimum value R2 (mm) of the radius of curvature of the second corner portion Sc2 of the bonding pattern S and a minimum value R3 (mm) of the radius of curvature of the third corner portion Sc3 thereof is preferably 1 mm or more. Thereby, unintentional peeling of sheets may be reduced more reliably. More preferably, the minimum value R2 (mm) of the radius of curvature of the second corner portion Sc2 and the minimum value R3 (mm) of the radius of curvature of the third corner portion Sc3 thereof is 2 mm or more. Thereby, unintentional peeling of sheets may be reduced even more reliably.

Meanwhile, in the graph of FIG. 12, the bonding strength is weakest when R=0. Based thereon, it may be recognized that by setting the first corner portion Sc1 as an acute angle as illustrated in FIGS. 4A to 4D, the sheets may be peeled off easily by turning over the sheets from the corner C1 side of the sheets. That is, it is preferable that at least a part of the first side portion Se1 and at least a part of the second side portion Se2 extend straightly toward the first corner portion Sc1, and that they intersect at the first corner portion Sc1. Thereby, the sheets may be peeled off easily from the corner C1 side.

Second Embodiment

A second embodiment will be described with reference to FIGS. 5 to 7. Hereinafter, elements denoted with the same reference numbers as the first embodiment have approximately the same configurations and effects as those described in the first embodiment, unless denoted otherwise, such that the portions that differ from the first embodiment will mainly be described below.

Figure 5:
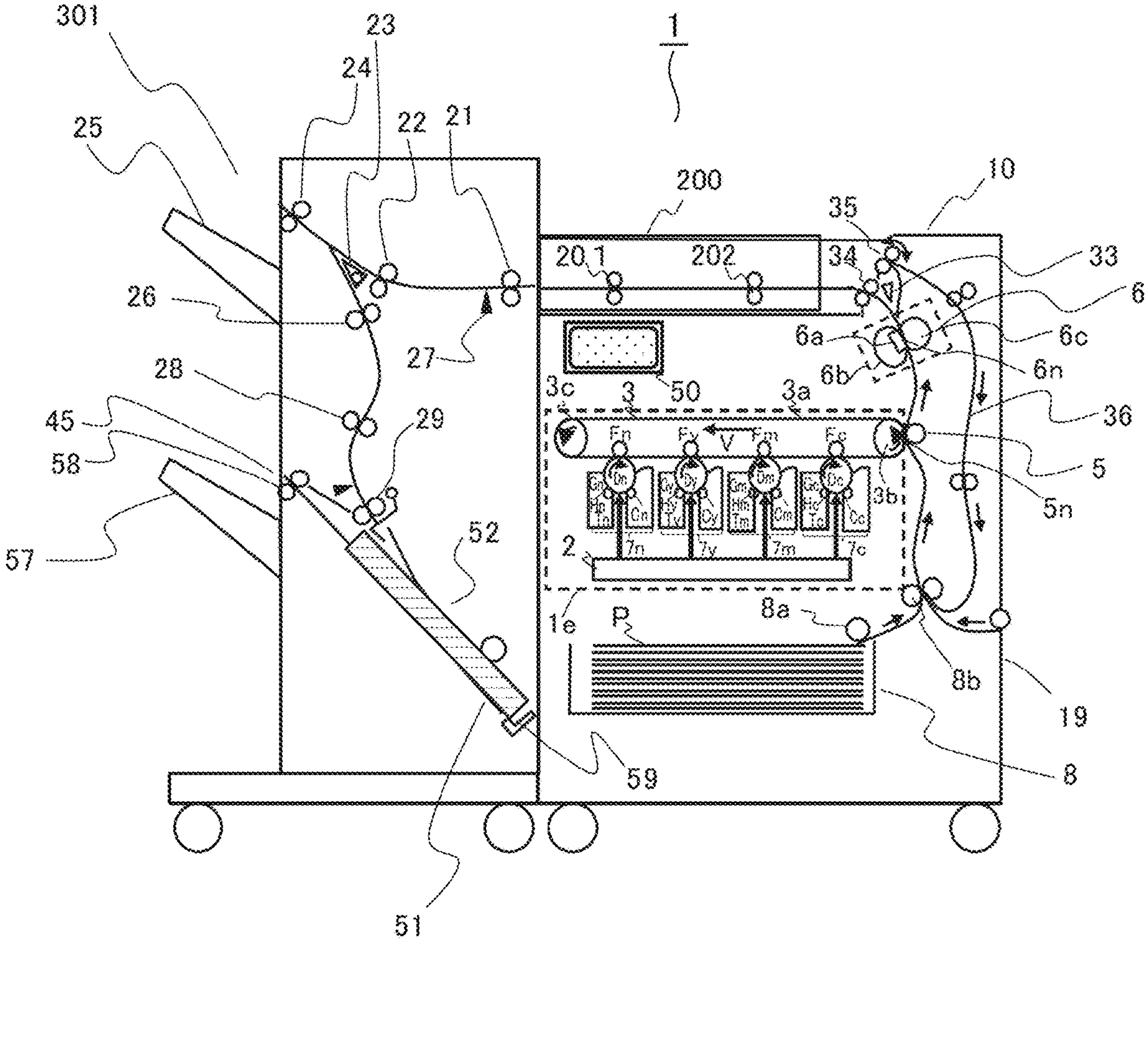
FIG. 5 is a schematic drawing of an image forming apparatus according to a second embodiment.

As illustrated in FIG. 5, the image forming apparatus 1 according to the present embodiment includes the apparatus body 10, a postprocessing apparatus 301 arranged at a side portion of the apparatus body 10, and a relay conveyance unit 200 connected to the apparatus body 10 and the postprocessing apparatus 301.

The postprocessing apparatus 301 includes an inlet roller pair 21, a conveyance roller pair 22, a reverse conveyance roller pair 24, an inner discharge roller pair 26, a conveyance roller pair 28, a kick-out roller pair 29, an intermediate supporting portion 52, i.e., processing tray, and the heat-and-pressure bonding unit 51. Further, the postprocessing apparatus 301 includes a bundle discharge guide 59, a bundle discharge roller pair 58, an upper discharge tray 25, and a lower discharge tray 57.

Similar to the first embodiment, the image forming apparatus 1 according to the present embodiment may create a product, i.e., bonded printed product, having bonded together a plurality of sheets P, after forming images successively to each of the sheets P one at a time. The sheet P to which a toner image has been formed in the apparatus body 10 is received by the inlet roller pair 21 of the postprocessing apparatus 301 via conveyance roller pairs 201 and 202 of the relay conveyance unit 200. The conveyance roller pair 22 conveys the sheet P received from the inlet roller pair 21 to the reverse conveyance roller pair 24. The conveyance roller pair 22 accelerates a conveyance speed of the sheet P based on a timing at which an inlet sensor 27 detects a trailing edge of the sheet P.

When it is not necessary to create a bonded printed product, a bonding pattern is not formed on the sheet P in the apparatus body 10. In that case, the conveyance speed of the sheet P is decelerated at a timing at which the trailing edge of the sheet P has reached a predetermined position between the conveyance roller pair 22 and the reverse conveyance roller pair 24, and the reverse conveyance roller pair 24 discharges the sheet P onto the upper discharge tray 25.

When creating a bonded printed product, a visible image and a bonding pattern are formed on the sheet P in the apparatus body 10. In this case, the rotation of the reverse conveyance roller pair 24 stops temporarily at a timing at which the trailing edge of the sheet P has passed through a backflow prevention guide 23 between the conveyance roller pair 22 and the reverse conveyance roller pair 24, and the reverse conveyance roller pair 24 is driven to rotate in an opposite direction. Thereby, the sheet P is subjected to switch-back, and is conveyed by the inner discharge roller pair 26, the conveyance roller pair 28, and the kick-out roller pair 29. Then, the sheet P is stacked on the intermediate supporting portion 43 via the kick-out roller pair 29. The sheets P being supported on the intermediate supporting portion 43 are aligned in both the width direction, i.e., lateral direction, and the conveyance direction, i.e., longitudinal direction, by a width-direction alignment portion and a conveyance-direction alignment portion.

If a predetermined number of sheets P are supported and aligned on the intermediate supporting portion 43, a heat-and-pressure bonding operation by the heat-and-pressure bonding unit 51 is performed. By having the bonding pattern on the sheets P heated and pressed by the heat-and-pressure bonding unit 51, a sheet bundle is created in which a plurality of sheets are bonded via a layer, i.e., bonding layer, of the powder adhesive Tn.

After the heat-and-pressure processing by the heat-and-pressure bonding unit 51 has been completed, the bundle discharge guide 59 moves from a standby position toward a discharge port 45, and pushes out the sheet bundle from the intermediate supporting portion 43. The bundle discharge roller pair 58 arranged at the discharge port 45 nips the sheet bundle, discharges the same to the outer side of the postprocessing apparatus 301, and causes the sheet bundle to be supported on the lower discharge tray 57.

A similar structure as the first embodiment (FIG. 2) may be adopted as the heat-and-pressure bonding unit 51. However, according to the present embodiment, a long-edge binding or a short-edge binding in which the sheet bundle is bound along one edge of the sheets P may be performed. Specifically, according to the present embodiment, A4-sized sheets P may be conveyed by long-edge conveyance, that is, with the long edge arranged in parallel with the sheet conveyance direction, so as to perform long-edge binding in which the respective sheets P of the sheet bundle are bound along the long edge. In correspondence therewith, the pressing range of the heating plate 502 is set to 4.0 mm in the X direction, i.e., lateral direction, and 300 mm in the Y direction, i.e., longitudinal direction, for example.

Bonding Pattern

Figure 6:
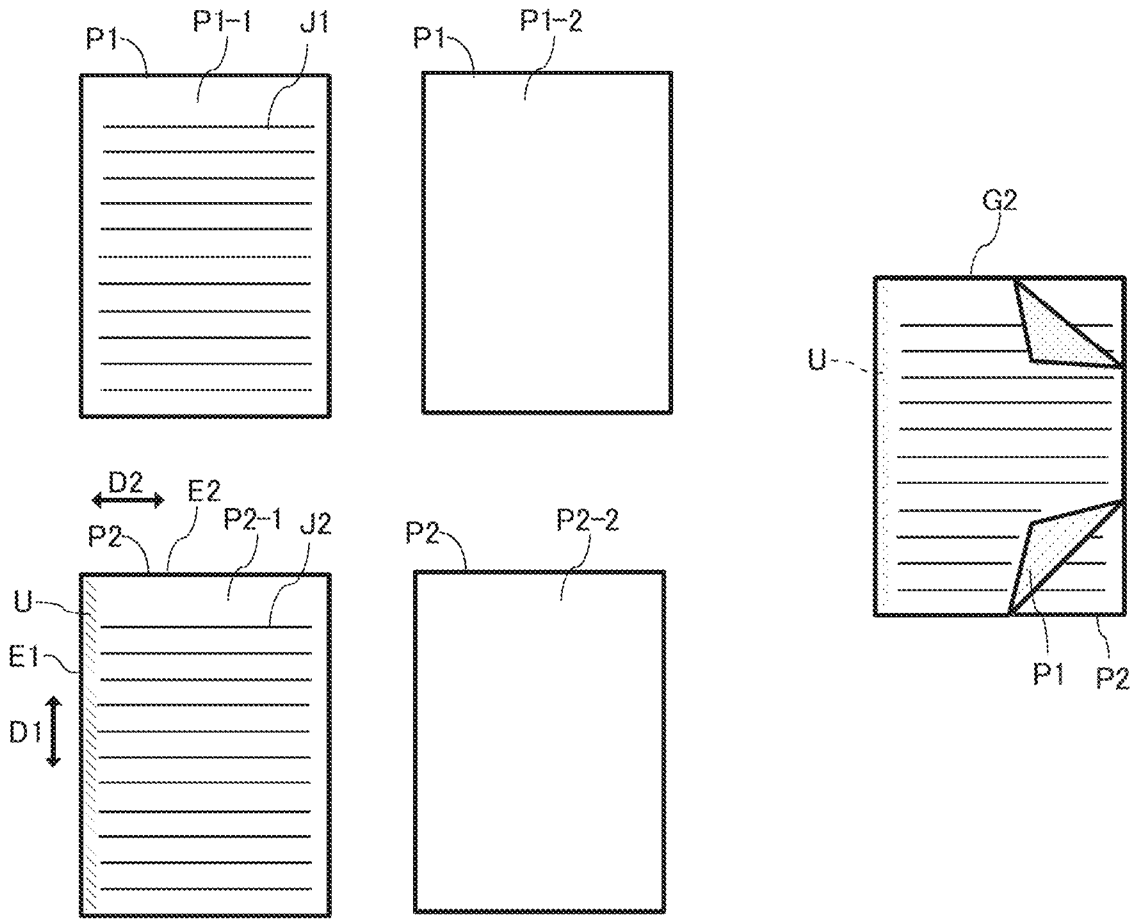
FIG. 6 is a view illustrating an example of a product according to the second embodiment.

FIG. 6 is a schematic diagram illustrating visible images J1 and J2 and a bonding pattern U when creating a product G2 which is a bonded printed product formed by subjecting two sheets P1 and P2 to long-edge binding. The first sheet P1 includes a front surface P1-1 that serves as a front cover of the product G2, and a rear surface P1-2. The second sheet P2 includes a front surface P2-1 that faces the rear surface P1-2 of the first sheet, and a rear surface P2-2 serving as a rear cover of the product G2. In this example, the first and second front surfaces P1-1 and P2-2 have visible images J1 and J2 formed thereto, and the rear surfaces P1-2 and P2-2 are blank sheets. The visible images J1 and J2 are formed using at least one kind of printing toner or more among the printing toners Ty, Tm, and Tc.

The bonding pattern U illustrated by the halftone-dotted area in the drawing is formed at a predetermined area on the front surface P2-1 of the second sheet P2 using the powder adhesive Tn. In the present embodiment, the bonding pattern U is formed along one long edge, referred to as the first edge E1, of the sheet P2. The shape of the bonding pattern U is stored in advance in a storage portion of the control unit of the image forming apparatus 1. It may be possible to allow the user to select or newly set the shape of the bonding pattern U.

Details of Bonding Pattern

The bonding pattern U will be described in detail. The powder adhesive Tn is applied according one of the bonding patterns U-1, U-2, U-3, U-4, and U-5 having a shape illustrated in FIGS. 7A to 7E. In the following description, the bonding patterns U-1, U-2, U-3, U-4, and U-5 illustrated in FIGS. 7A to 7E are collectively referred to as the respective bonding patterns U.

At first, a shape that is common to the respective bonding patterns U will be described. The contour of the bonding pattern U has an approximately rectangular shape having four side portions, i.e., edges, and four corner portions. FIG. 6 illustrates an example in which one bonding pattern U is formed across approximately the entire length of the first edge E1 of the sheet P, but it is also possible to have a plurality of bonding patterns U aligned and formed along the first edge E1.

The bonding pattern U includes a first side portion Ue1, a second side portion Ue2, a third side portion Ue3, and a fourth side portion Ue4. Further, the bonding pattern U includes a first corner portion Uc1 connecting the first side portion Ue1 and the second side portion Ue2, and a second corner portion Uc2 connecting the first side portion Ue1 and the fourth side portion Ue4. Further, the bonding pattern U includes a third corner portion Uc3 connecting the third side portion Ue3 and the second side portion Ue2, and a fourth corner portion Uc4 connecting the third side portion Ue3 and the fourth side portion Ue4.

The bonding pattern U has a long and narrow shape that extends along the first side edge E1 of the sheet P. The first side portion Ue1 extends along the first edge E1 (FIG. 6) of the sheet P. The third side portion Ue3 is positioned closer to a center side of the sheet P than the first side portion Ue1 in the direction D2 of the second edge E2.

In the respective bonding patterns U, the third corner portion Uc3 is curved such that a minimum value of a radius of curvature of the third corner portion Uc3 is greater than a minimum value of a radius of curvature of the first corner portion Uc1 and a minimum value of a radius of curvature of the second corner portion Uc2. Further, the fourth corner portion Uc4 is curved such that a minimum value of a radius of curvature of the fourth corner portion Uc4 is greater than the minimum value of the radius of curvature of the first corner portion Uc1 and the minimum value of the radius of curvature of the second corner portion Uc2. It is assumed that the minimum value of the radius of curvature of the first corner portion Uc1 is denoted by r1 (mm), the minimum value of the radius of curvature of the second corner portion Uc2 is denoted by r2 (mm), the minimum value of the radius of curvature of the third corner portion Uc3 is denoted by r3 (mm), and the minimum value of the radius of curvature of the fourth corner portion Uc4 is denoted by r4 (mm). In that case, $r1<r3$, $r2<r3$, $r1<r4$, and $r2<r4$ are satisfied. In other words, the respective bonding patterns U have the third corner portion Uc3 and the fourth corner portion Uc4 which are close to a center area of the sheet P on which the visible image is mainly formed created in a curved line shape, i.e., rounded shape, which is curved more gently compared to the first corner portion Uc1 and the second corner portion Uc2 close to the side edges of the sheet P.

When the product G2 that has been bound along the first edge E1 as illustrated in FIG. 6 has been created, it may be possible to assume that the user turns over the sheet P1 from the lower right toward the upper left, or from the upper right toward the lower left. In that case, a stress in a direction causing the sheets P1 and P2 to be peeled off, that is, a tensile force in a thickness direction of the sheet, occurs at the third corner portion Uc3 and the fourth corner portion Uc4 of the bonding pattern U. If the third corner portion Uc3 and the fourth corner portion Uc4 are formed as an acute angle, stress may concentrate at the corner and the bonding pattern U may tend to be peeled therefrom.

According to the present embodiment, concentration of stress may be avoided by having the third corner portion Uc3 and the fourth corner portion Uc4 rounded. Therefore, when the user turns over the sheet of the product G2 according to a normal method of use, the possibility of sheets P1 and P2 being peeled off may be reduced. That is, according to the present embodiment, unintentional peeling of sheets may be reduced.

Meanwhile, the first corner portion Uc1 and the second corner portion Uc2 have a smaller minimum value of the radius of curvature compared to the third corner portion Uc3 and the fourth corner portion Uc4, such that stress tends to concentrate, and may easily cause peeling of the bonding pattern U. Therefore, there is an advantage that if the user wishes to peel off the sheets P1 and P2, the user may turn over the sheet P1 from either one of the corner portions on the first edge E1 side of the product G2 to cause the sheets P1 and P2 to be peeled off easily.

Similar to the first embodiment, the minimum value (r3) of the radius of curvature of the third corner portion Uc3 and the minimum value (r4) of the radius of curvature of the fourth corner portion Uc4 are preferably 1 mm or more, and more preferably 2 mm or more. Thereby, unintentional peeling of sheets may be reduced even more reliably.

Meanwhile, the first corner portion Uc1 and the second corner portion Uc2 may be corners at which adjacent side portions of the bonding pattern U intersect at one point. Thereby, the sheets may be more easily peeled from one of the corner portions at the first edge E1 side of the product G1.

Figure 7A:
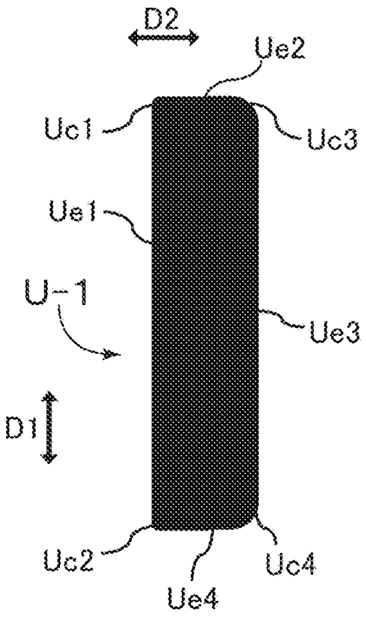
FIGS. 7A to 7E are each an example of a bonding pattern according to the second embodiment.
Figure 7B:
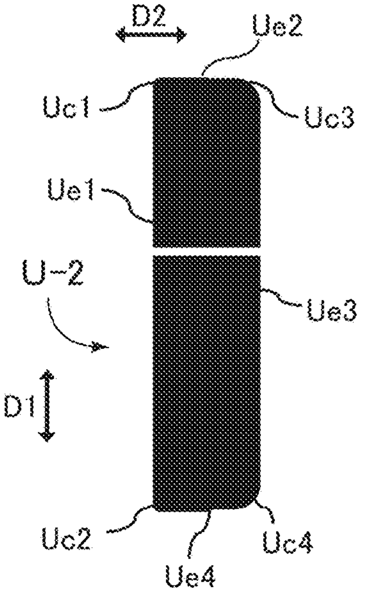
Figure 7C:
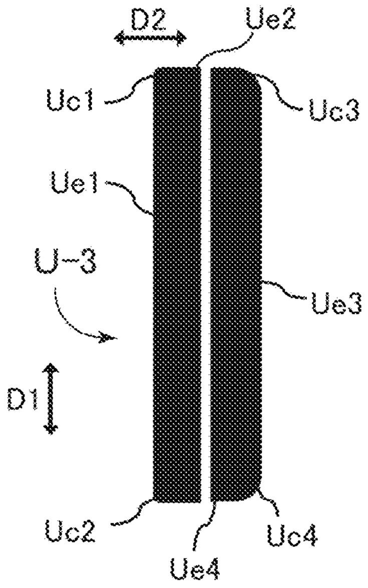
Figure 7D:
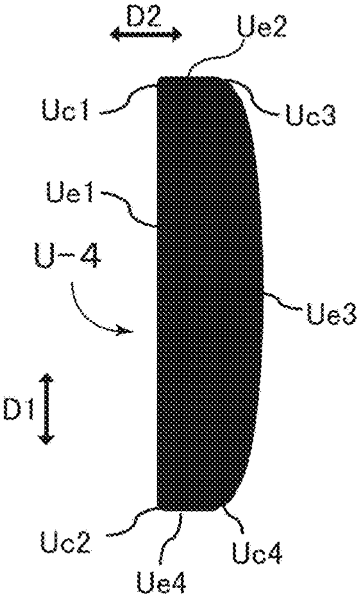
Figure 7E:
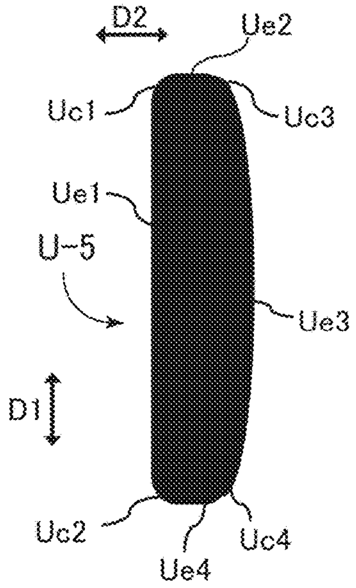

As illustrated in FIG. 7A, the bonding pattern U-1 may be a rectangular shape in which the third corner portion Uc3 and the fourth corner portion Uc4 are rounded in an arc shape and the first corner portion Uc1 and the second corner portion Uc2 are right-angled. As illustrated in FIGS. 7B and 7C, the bonding patterns U-2 and U-3 may be rectangular shapes similar to FIG. 7A, wherein the application area of the powder adhesive Tn may be divided into two or more areas. The application amount of the powder adhesive Tn may be varied between these areas, as described in the third embodiment described below. In that case, it is preferable for the application amount of the powder adhesive Tn in the second area including the third corner portion Uc3 and the fourth corner portion Uc4 to be greater than the application amount of the powder adhesive Tn in the first area including the first corner portion Uc1 and the second corner portion Uc2. As illustrated in FIG. 7D, the bonding pattern U-1 may be curved such that the third side portion Ue3 protrudes toward the center side in the direction D2 of the second edge E2. As illustrated in FIG. 7E, the bonding pattern U-1 may adopt curved line shapes in which each of the four side portions are curved.

The respective bonding patterns U according to the present embodiment may be formed on each of the sheet surfaces that face each other in the stacked state, as described in the fort embodiment illustrated below.

Third Embodiment

A third embodiment will be described with reference to FIGS. 8A to 8I. Hereinafter, elements denoted with the same reference numbers as the first embodiment have approximately the same configurations and effects as those described in the first embodiment, unless denoted otherwise, such that the portions that differ from the first embodiment will mainly be described below.

As illustrated in FIGS. 8A to 8I, according to the present embodiment, an area in which the application amount of the powder adhesive Tn is greater than other areas is provided to a portion of a bonding pattern formed on the sheet P. The shapes and application amounts of the powder adhesive Tn in each area of the respective bonding patterns S are stored in advance in a storage portion of the control unit of the image forming apparatus 1. It may also be possible to allow the user to select or newly set a shape of the bonding pattern S and an application amount of the powder adhesive Tn per area.

Figure 8A:
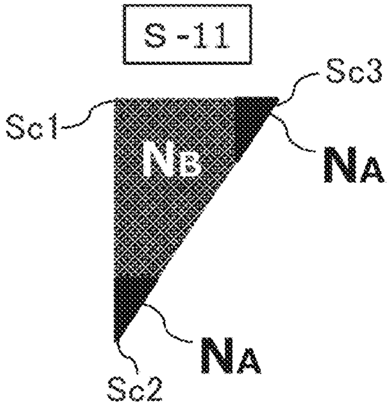
FIGS. 8A to 8I are each a view illustrating a bonding pattern according to a third embodiment.
Figure 8B:
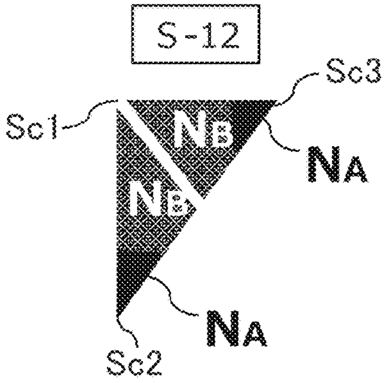
Figure 8C:
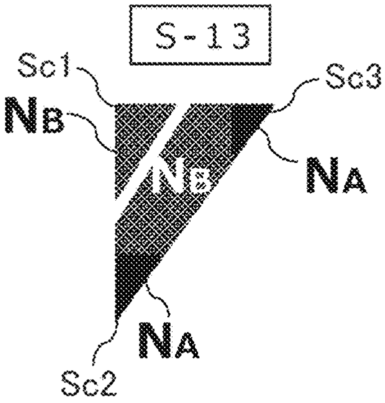
Figure 8D:
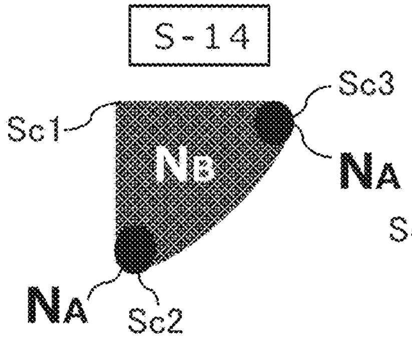
Figure 8E:
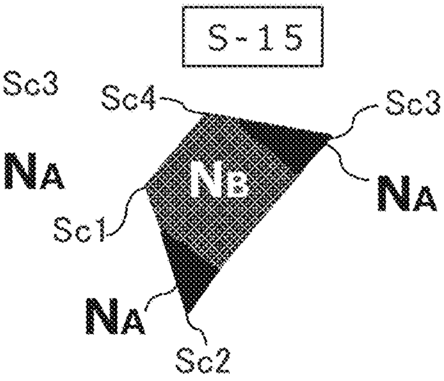
Figure 8F:
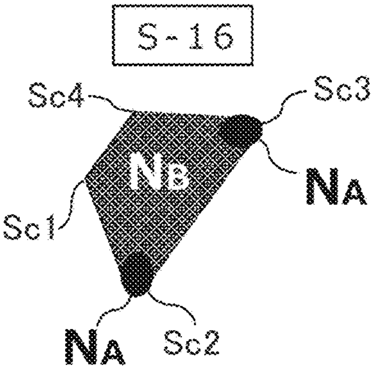
Figure 8G:
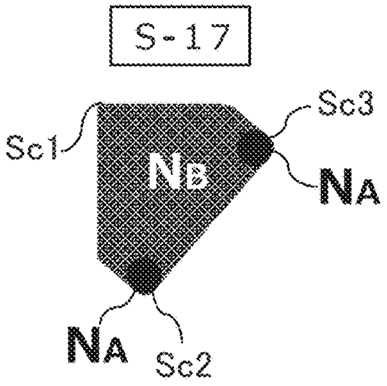

FIGS. 8A to 8I illustrate examples of the bonding pattern S for performing corner bonding, similar to the first embodiment. The bonding patterns S-11, S-12, S-13, S-14, S-17, S-18, and S-19 illustrated in FIGS. 8A to 8I have an approximately triangle-shape contour including the first corner portion Sc1, the second corner portion Sc2, and the third corner portion Sc3. More accurately, the bonding patterns S-15 and S-16 illustrated in FIGS. 8E and 8F are formed in a trapezoidal shape including a fourth corner portion Sc4 in addition to the first corner portion Sc1, the second corner portion Sc2, and the third corner portion Sc3.

In these examples, the application amount of the powder adhesive Tn in the area NA, i.e., second area, including the second corner portion Sc2 and the third corner portion Sc3 in the respective bonding patterns S is greater than the application amount of the powder adhesive Tn in the area NB, i.e., first area, including the first corner portion Sc1. That is, each bonding pattern S includes the first area (NB) including the first corner portion Sc1, and the second area (NA) which is a second area including the second corner portion Sc2 and the third corner portion Sc3 and whose application amount of powder adhesive is greater than the application amount of powder adhesive in the first area.

Thereby, the bonding strength of the second corner portion Sc2 and the third corner portion Sc3 where stress tends to concentrate when the user turns over the sheets of the corner-bound product may be enhanced, and the possibility of the sheets being peeled off unintentionally starting from the second corner portion Sc2 or the third corner portion Sc3 may be reduced.

Further, since the application amount of the powder adhesive Tn in the first area (NB) is smaller than the application amount of the powder adhesive Tn in the second area (NA), it becomes possible to reduce the amount of consumption of the powder adhesive Tn while reducing the possibility of unintentional peeling of sheets.

Since the application amount of the powder adhesive Tn in the first corner portion Sc1, and the fourth corner portion Sc4, is small, there is an advantage in that when the user wishes to peel off the sheets P1 and P2, the user may turn over the sheet P1 from the corner C1 of the product G1 to easily peel off the sheets P1 and P2.

As illustrated in FIG. 8A, the bonding pattern S-11 may adopt a right-angled triangle shape. As illustrated in FIGS. 8B and 8C, the bonding patterns S-12 and S-13 adopt a similar right-angled triangle shape as FIG. 8A, and may have the application area of the powder adhesive Tn divided into two or more areas.

Figure 8H:
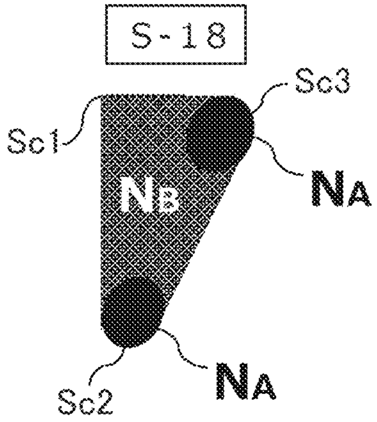
Figure 8I:
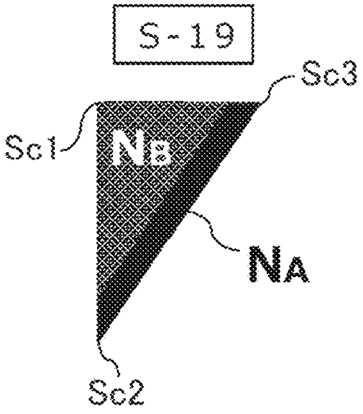

As illustrated in FIGS. 8D and 8H, the bonding patterns S-14 and S-18 may adopt an approximately triangle shape in which the second corner portion Sc2 and/or the third corner portion Sc3 is/are rounded. In that case, similar to the first embodiment, by rounding the corner portion and increasing the application amount of the powder adhesive Tn, the possibility of the sheet being peeled off unintentionally starting from the second corner portion Sc2 or the third corner portion Sc3 may be reduced even further.

As illustrated in FIGS. 8A to 8I, the shape of the area (NA) where the application amount of the powder adhesive Tn is great is not specifically limited, and for example, it can adopt a triangle shape, a round shape, an oval shape, a square shape, or a trapezoidal shape.

As illustrated in FIG. 81, the area (NA) of the bonding pattern S-19 where the application amount of the powder adhesive Tn is great may be a single area that is continuous along the third side portion Se3 from the second corner portion Sc2 to the third corner portion Sc3. In that case, since the bonding strength of the entire third side portion Se3 is high, the possibility of sheets being peeled off unintentionally when the user turns over the sheet of a corner-bound product may be reduced even further.

Fourth Embodiment

A fourth embodiment will be described. Hereinafter, elements denoted with the same reference numbers as the first embodiment have approximately the same configurations and effects as those described in the first embodiment, unless denoted otherwise, such that the portions that differ from the first embodiment will mainly be described below.

Figure 9:
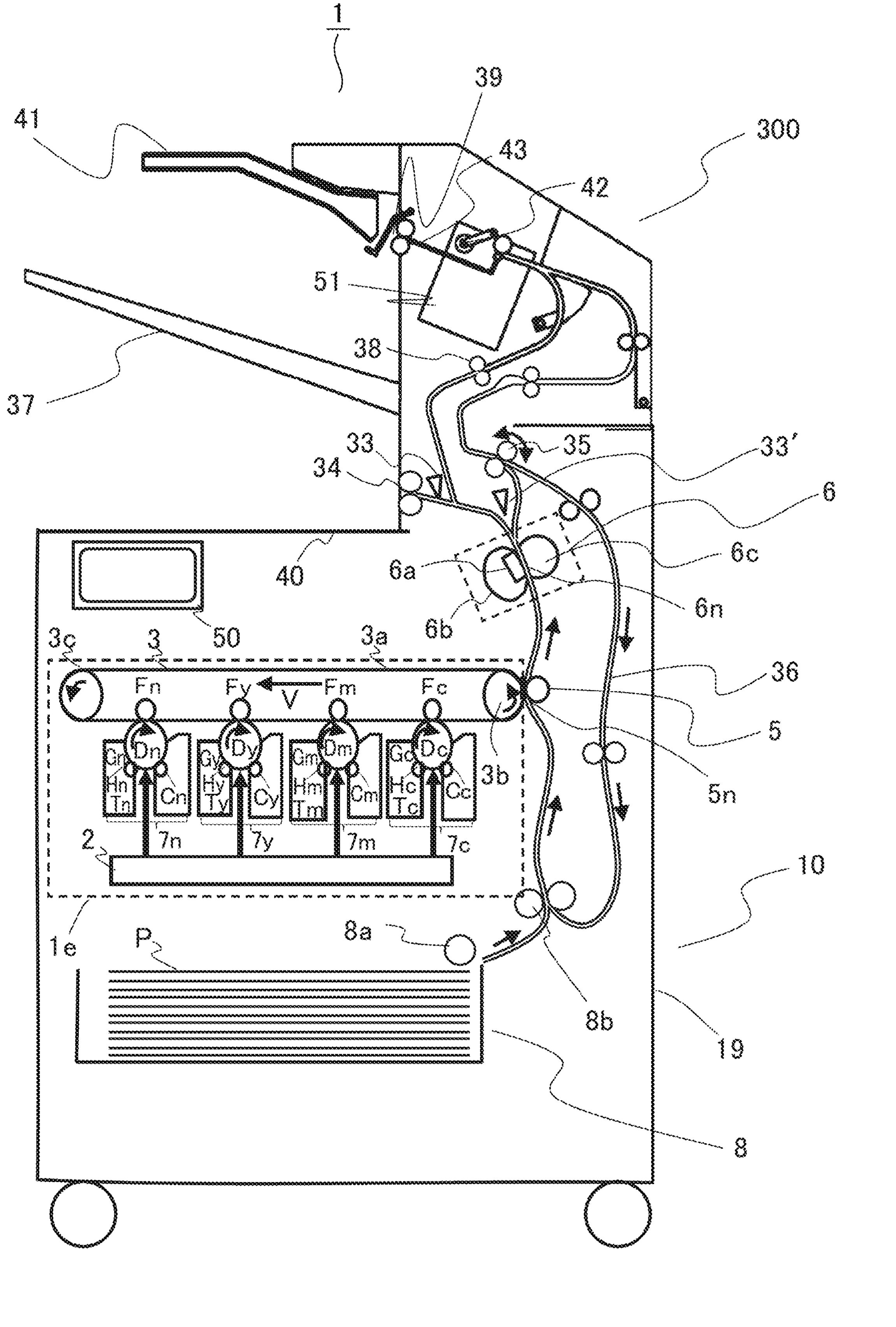
FIG. 9 is a schematic drawing of an image forming apparatus according to a fourth embodiment.

FIG. 9 is a schematic drawing of the image forming apparatus 1 according to the present embodiment. In the present embodiment, when the image forming apparatus 1 creates a bonded printed product, visible images and bonding patterns may be formed on both sides of the sheet P. In the following description, a corner-bound product is described as an example, but it is also possible to create a product that is bound along one edge of the sheet, as described in the second embodiment.

As illustrated in FIG. 9, the image forming apparatus 1 includes a switch guide 33', a reverse conveyance roller pair 35, and a duplex conveyance path 36. The sheet P having passed through the fixing unit 6 is guided to one of two conveyance paths by the switch guide 33' serving as a flap-like guide member. A first conveyance path is a path, i.e., sheet discharge path, leading to the discharge roller pair 34 or the postprocessing apparatus 300. A second conveyance path is a path, i.e., reverse conveyance path, leading to the reverse conveyance roller pair 35.

The user may select, as a setting information of an image forming job, a simplex printing mode of forming an image on one side of the sheet P, and a duplex printing mode of forming images on both sides of the sheet P. When the simplex printing mode is designated, the sheet P having passed through the fixing unit 6 is guided by the switch guide 33' to the sheet discharge path. When the duplex printing mode is designated, the sheet P having passed through the fixing unit 6 in a state where a toner image has been formed on a first surface is guided by the switch guide 33' to the reverse conveyance path. Thereafter, the sheet P is subjected to switch-back by the reverse conveyance roller pair 35, and conveyed via the duplex conveyance path 36 again to the image forming unit 1*e*. Then, the sheet P having a toner image formed on a second surface opposite to the first surface by passing through the transfer nip 5*n* and the fixing nip 6*n* is guided by the switch guide 33' to the sheet discharge path. The conveyance operation of the sheet P after being guided to the sheet discharge path is similar to the first embodiment.

Figure 10:
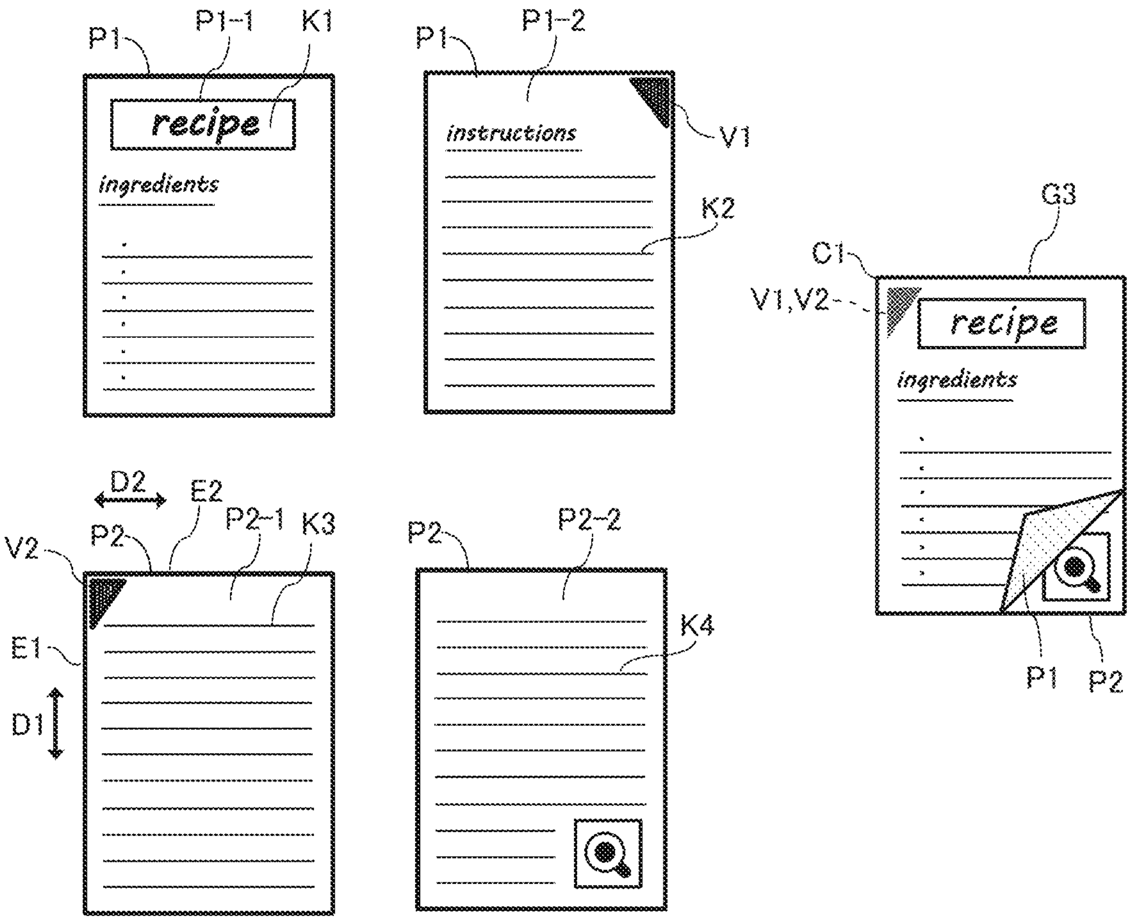
FIG. 10 is a view illustrating an example of a product according to the fourth embodiment.

FIG. 10 is a schematic diagram illustrating visible images K1 to K4 and bonding patterns V1 and V2 when creating a product G3 which is a bonded printed product in which two sheets P1 and P2 are corner-bound. The first sheet P1 includes a front surface P1-1 serving as a front cover of the product G3, and a rear surface P1-2. The second sheet P2 includes a front surface P2-1 that faces the rear surface P1-2 of the first sheet, and a rear surface P2-2 serving as a rear cover of the product G3. In this example, visible images K1 and K2 are respectively formed on the front surface P1-1 and the rear surface P1-2 of the first sheet, and visible images K3 and K4 are respectively formed on the front surface P2-1 and the rear surface P2-2 of the second sheet.

The bonding patterns V1 and V2 are formed on each of the rear surface P1-2, i.e., first sheet surface, of the first sheet, and the front surface P2-1, i.e., second sheet surface, of the second sheet, which are sheet surfaces that face each other when the sheets P1 and P2 are stacked. The bonding patterns V1 and V2 are formed at positions that face each other when the sheets P1 and P2 are in a stacked state. The visible images K1 to K4 are formed using at least one of the printing toners Ty, Tm, and Tc. The bonding patterns V1 and V2 may adopt shapes similar to those described in the first embodiment. The shapes of the bonding patterns V1 and V2 are stored in advance in a storage portion of the control unit of the image forming apparatus 1. The user may be enabled to select or newly set the shapes of the bonding patterns V1 and V2.

Generally, when creating a bonded printed product, bonding strength may be enhanced by forming bonding patterns on each of the sheet surfaces that face each other when the sheets are stacked, compared to a case where the bonding pattern is formed on only one of the sheet surfaces.

However, if one bonding pattern is displaced from the other bonding pattern when the sheets are stacked, the sheets may be easily peeled starting from the displaced portion. In further detail, as illustrated on the left side of FIG. 11, the third corner portions Sc3 of the bonding patterns V1 and V2 may be displaced, i.e. displaced portion Q1, or the second corner portions Sc2 of the bonding patterns V1 and V2 may be displaced, i.e., displaced portion Q2. The displaced portion Q1 is caused by positional displacement of the bonding patterns V1 and V2 in the sheet conveyance direction, i.e., longitudinal direction, for example. The displaced portion Q2 is caused by displacement of the amount of margin in the width direction, i.e., lateral direction, for example.

Figure 11:
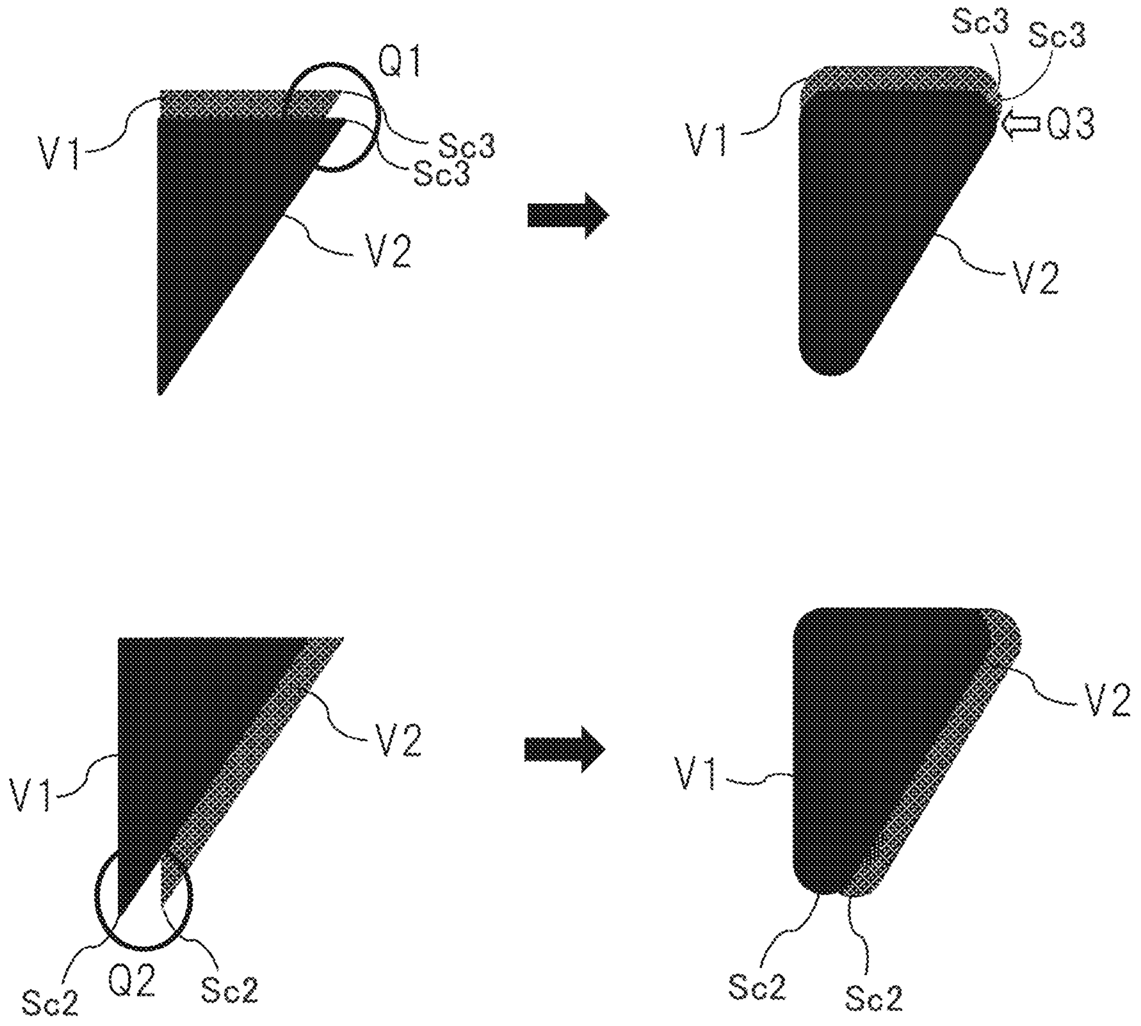
FIG. 11 is an explanatory view of a bonding pattern according to the fourth embodiment.

In the present embodiment, as illustrated on the right side of FIG. 11, the bonding patterns V1 and V2 each adopt a shape where the second corner portion Sc2 and the third corner portion Sc3 are rounded, similar to the first embodiment. The second corner portion Sc2 and the third corner portion Sc3 adopt a gently curved shape. Thereby, even if the second corner portions or the third corner portions Sc3 of the bonding patterns V1 and V2 are displaced, the possibility of sheets being peeled off starting from the displaced portion may be reduced.

That is, according to the example illustrated on the upper left side of FIG. 11, in the displaced portion Q1, (a) the third corner portion Sc3 of the bonding pattern V1, (b) the third corner portion Sc3 of the bonding pattern V2, and (c) the area where the third corner portions Sc3 of the bonding patterns V1 and V2 overlap, are all acute angles. Therefore, when the user turns over the sheet P1 of the product G3 illustrated in FIG. 10 from right to left, stress may concentrate sequentially on the corners of (a) to (c), and peeling may be caused.

In contrast, according to the example illustrated on the upper right side of FIG. 11, (a) the third corner portion Sc3 of the bonding pattern V1 and (b) the third corner portion Sc3 of the bonding pattern V2 both adopt a gently curved shape. According further to the example illustrated on the upper right side of FIG. 11, (c) an area Q3 where the third corner portions Sc3 of the bonding patterns V1 and V2 overlap does not adopt an acute angle shape, and instead, adopts a shape with a certain level of width in the up-down direction of the drawing. Therefore, when the user turns over the sheet P1 of the product G3 from right to left in FIG. 10, for example, the sheets are not easily peeled since not only the bonding strength of the corner portions of (a) and (b) but also the bonding strength of the area Q3 of (c) are high. Therefore, unintentional peeling of sheets may be reduced even more reliably.

Similar to the first embodiment, the minimum value (R2) of the radius of curvature of the second corner portion Sc2 and the minimum value (R3) of the radius of curvature of the third corner portion Sc3 are preferably 1 mm or more, and more preferably, 2 mm or more. Thereby, unintentional peeling of sheets may be reduced even more reliably.

OTHER EXAMPLES

In the embodiments described above, an example has been illustrated of a case where a product composed of two sheets P1 and P2 is created, but the present technique may also be applied to a case where a product, i.e., bonded printed product, including three of more sheets P is created. In that case, the bonding pattern S may be formed on at least one of the sheet surfaces facing each other a state where the sheets are stacked on the intermediate supporting portion 43. The postprocessing apparatus 300 may perform heat-and-pressure bonding operation of the heat-and-pressure bonding unit 51 after all the sheets P included in one product are supported and aligned on the intermediate supporting portion 43. Further, the postprocessing apparatus 300 may repeatedly perform the heat-and-pressure bonding operation of the heat-and-pressure bonding unit 51 each time a predetermined number of sheets P are supported and aligned on the intermediate supporting portion 43.

According to the present disclosure, unintentional peeling of sheets may be reduced.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-131545, filed on Aug. 10, 2023, which is hereby incorporated by reference herein in its entirety.

What is claimed is:

1. An image forming apparatus comprising:

an image forming unit configured to form both a visible image and a bonding pattern on a sheet, the bonding pattern being formed of powder adhesive and to be used to bond sheets together; and a bonding unit configured to heat a plurality of sheets in a stacked state, to bond the plurality of sheets together via the bonding pattern, wherein the bonding pattern is a triangular-shaped pattern including a first side portion, a second side portion, a third side portion, a first corner portion connecting the first side portion and the second side portion, a second corner portion connecting the second side portion and the third side portion, and a third corner portion connecting the third side portion and the first side portion, wherein in a direction of a diagonal line passing a corner where a first edge and a second edge of the sheet intersect, the first corner portion is positioned on a near side to the corner of the sheet, and both the second corner portion and the third corner portion are positioned on a far side from the corner of the sheet, and wherein both the second corner portion and the third corner portion are curved such that a minimum value of a radius of curvature of the second corner portion and a minimum value of a radius of curvature of the third corner portion are greater than a minimum value of a radius of curvature of the first corner portion.

2. The image forming apparatus according to claim 1, wherein the minimum value of the radius of curvature of the second corner portion and the minimum value of the radius of curvature of the third corner portion are each 1 mm or more.

3. The image forming apparatus according to claim 1, wherein the minimum value of the radius of curvature of the second corner portion and the minimum value of the radius of curvature of the third corner portion are each 2 mm or more.

4. The image forming apparatus according to claim 1, wherein at least a part of the first side portion and at least a part of the second side portion extend straightly toward the first corner portion and intersect at the first corner portion.

5. The image forming apparatus according to claim 1, wherein the bonding pattern is formed on each of a first sheet surface and a second sheet surface that face each other in the plurality of sheets in the stacked state.

6. The image forming apparatus according to claim 1, wherein the bonding pattern includes a first area including the first corner portion and a second area including the second corner portion and the third corner portion, and wherein an application amount of the powder adhesive per unit area in the second area is greater than an application amount of the powder adhesive per unit area in the first area.

7. The image forming apparatus according to claim 6, wherein the second area is continuous along the third side portion from the second corner portion to the third corner portion.

8. The image forming apparatus according to claim 1, wherein the first side portion, the second side portion, and the third side portion each extend straightly and are arranged to form a right-angled triangle in which the first side portion and the second side portion intersect orthogonally at the first corner portion and whose hypotenuse is an extended line of the third side portion, and wherein the second corner portion and the third corner portion are each a curved line in which an acute angle of the right-angled triangle is rounded in an arc shape.

9. An image forming apparatus comprising:

an image forming unit configured to form both a visible image and a bonding pattern on a sheet, the bonding pattern being formed of powder adhesive and to be used to bond sheets together; and a bonding unit configured to heat a plurality of sheets in a stacked state, to bond the plurality of sheets together via the bonding pattern, wherein the bonding pattern is a rectangular-shaped pattern including a first side portion, a second side portion, a third side portion, a fourth side portion, a first corner portion connecting the first side portion and the second side portion, a second corner portion connecting the first side portion and the fourth side portion, a third corner portion connecting the third side portion and the second side portion, and a fourth corner portion connecting the third side portion and the fourth side portion, wherein the bonding pattern is extended in a long and narrow shape along a first edge of the sheet, wherein the first side portion is extended along the first edge of the sheet, wherein in a direction in which a second edge of the sheet that intersects the first edge extends, the third side portion is positioned closer to a center of the sheet than the first side portion, wherein the third corner portion is curved such that a minimum value of a radius of curvature of the third corner portion is greater than both a minimum value of a radius of curvature of the first corner portion and a minimum value of a radius of curvature of the second corner portion, and wherein the fourth corner portion is curved such that a minimum value of a radius of curvature of the fourth corner portion is greater than both the minimum value of the radius of curvature of the first corner portion and the minimum value of the radius of curvature of the second corner portion.

10. The image forming apparatus according to claim 9, wherein the minimum value of the radius of curvature of the third corner portion and the minimum value of the radius of curvature of the fourth corner portion are each 1 mm or more.

11. The image forming apparatus according to claim 9, wherein the minimum value of the radius of curvature of the third corner portion and the minimum value of the radius of curvature of the fourth corner portion are each 2 mm or more.

12. The image forming apparatus according to claim 9, wherein the bonding pattern is formed on each of a first sheet surface and a second sheet surface that face each other in the plurality of sheets in the stacked state.

13. The image forming apparatus according to claim 9, wherein the bonding pattern includes a first area including the first corner portion and a second area including the second corner portion and the third corner portion, and wherein an application amount of the powder adhesive per unit area in the second area is greater than an application amount of the powder adhesive per unit area in the first area.

14. The image forming apparatus according to claim 9, wherein the first side portion, the second side portion, the third side portion, and the fourth side portion each extend straightly, wherein the first side portion and the second side portion are arranged to intersect orthogonally at the first corner portion, wherein the first side portion and the fourth side portion are arranged to intersect orthogonally at the second corner portion, and wherein the third corner portion and the fourth corner portion are each a curved line having an arc shape.

* * * * *